US008745759B2

(12) United States Patent
Halas

(10) Patent No.: US 8,745,759 B2
(45) Date of Patent: Jun. 3, 2014

(54) ASSOCIATED WITH ABNORMAL APPLICATION-SPECIFIC ACTIVITY MONITORING IN A COMPUTING NETWORK

(75) Inventor: Miroslav Halas, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 408 days.

(21) Appl. No.: 13/018,373

(22) Filed: Jan. 31, 2011

(65) Prior Publication Data
US 2012/0198569 A1 Aug. 2, 2012

(51) Int. Cl.
*H04L 9/00* (2006.01)
(52) U.S. Cl.
USPC .............................................. 726/30; 726/26
(58) Field of Classification Search
None
See application file for complete search history.

(56) References Cited

U.S. PATENT DOCUMENTS

| | | | | |
|---|---|---|---|---|
| 7,272,855 | B1 * | 9/2007 | Yemeni et al. | 726/23 |
| 7,497,379 | B2 * | 3/2009 | Chen et al. | 235/454 |
| 7,962,955 | B2 * | 6/2011 | Boss et al. | 726/22 |
| 2005/0114708 | A1 * | 5/2005 | DeStefano et al. | 713/201 |
| 2005/0120214 | A1 * | 6/2005 | Yeates et al. | 713/171 |
| 2005/0246716 | A1 * | 11/2005 | Smith et al. | 719/315 |
| 2006/0200668 | A1 * | 9/2006 | Hybre et al. | 713/168 |
| 2009/0138592 | A1 * | 5/2009 | Overcash et al. | 709/224 |

OTHER PUBLICATIONS

Heady et al., "The Architecture of a Network Level Intrusion Detection System", Dept. of Computer Science, University of New Mexico, 1990.*

* cited by examiner

*Primary Examiner* — William Powers
(74) *Attorney, Agent, or Firm* — Michael A. Springs; Moore & Van Allen PLLC; James C. Edwards

(57) ABSTRACT

Embodiments herein disclosed provide for computer network security and, more specifically, monitoring application-based access to secure data and monitoring predetermined actions conducted on applications to determine abnormal access or abnormal actions. Specific embodiments of the invention provide for improved database which implements time period-structured tables and file directories. Such structuring of the database provides for automated data purging, backing-up of data and data recovery. Additional embodiments provide for tracking data attributes related to the monitored data, such as the quality of the monitored data, the quality of the monitored data and the origin of the monitored data. In addition, embodiments provide for validating the source of the monitored data to assure that data is received from a valid application.

45 Claims, 15 Drawing Sheets

ASSOCIATED WITH ABNORMAL APPLICATION-SPECIFIC ACTIVITY MONITORING IN A COMPUTING NETWORK

FIELD OF THE INVENTION

In general, embodiments herein disclosed relate to systems, methods, and computer program products for computer network security and, more specifically, monitoring access to secure data through applications and monitoring predetermined actions conducted on applications to determine abnormal access or abnormal actions.

BACKGROUND OF THE INVENTION

Conventional network information security systems allowed access to sensitive information, for example via a password, without anyone in the organization knowing what information was being accessed by an application or how the information was accessed. Some traditional information security systems generated and maintained user logs. However, such systems do not provide for easily determining what information was accessed, who accessed it and what functions were perform with the information, without burdening the system with applications running on an application layer. In addition, such systems do not provide for monitoring predetermined actions taken at the application level, which may be a cause for concern in terms of data security or performing prohibited and/or illegal actions.

Embodiments of the present invention address at least the above-noted drawbacks associated with traditional information security systems.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Methods, systems and computer program products are defined that provide 1.

A method for determining abnormal behavior in a computing network defines first embodiments of the invention. The method includes receiving first data related to accessing secure information via predetermined applications and second data related to performing predetermined actions via predetermined applications. The method additionally includes storing the first and second data in a database, which is configured to store the first and second data in a specified table based on a predetermined period of time, such a s a calendar month or the like, associated with the receipt of the data. In addition, the method includes determining one or more abnormal behaviors based on comparing the first data to predetermined first abnormal access criteria and comparing the second data to predetermined abnormal action criteria.

In specific embodiments the method further includes generating a new table in the database based on occurrence of a new predetermined time period, such as generating a new table based on anew calendar month or the like.

In additional specific embodiments the method further includes automatically purging a specified table from the database based on a time period associated with the specified table and a predetermined time required for storage.

Other specific embodiments of the method provide for storing the first and second data in a file system, which is configured to store the first and second data in a specified file directory based on a date associated with the receipt of the data. In such embodiments the method may additionally include automatically purging a specified file directory from the file system based on a date associated with the specified file directory and a predetermined time required for storage.

In still further specific embodiments the method includes communicating, the stored first and second data to a back-up database, which is configured to store the first and second data for a predetermined period of time.

A further method for monitoring data attributes in a system for determining abnormal behavior in a computing network provides for second embodiments of the invention. The method includes receiving first data related to accessing secure information via predetermined applications and second data related to performing predetermined actions via predetermined applications. The method further includes tracking first data attributes related to the first data and second data attributes related to the second data. The first and second data attributes are associated with at least one of (a) an origin of the data; (b) a quantity of data received or (c) a quality of data received. Additionally, the method includes automatically generating one or more reports that indicate performance of the system based on the first data attributes and second data attributes. In addition the method provides that the received first data is compared to predetermined abnormal access criteria and the second data is compared to predetermined abnormal action criteria to determine one or more abnormal behaviors.

In specific embodiments of the method, tracking further includes tracking the first and second data attributes that are associated with the quantity of data received including one or more of (a) an overall volume of first and second data being received, (b) a volume of first and second data being received from a specified application, or (c) a volume of first and second data being received that is associated with one or more specific users.

In other specific embodiments of the method, tracking further includes tracking the first and second data attributes that are associated with the quality of data being received including one or more of (a) a volume of first and second data being stored, (b) a volume of first and second data being rejected (c) a reason for rejecting first or second data.

In still further specific embodiments of the method, tracking further includes tracking the first and second data attributes that are associated with the origin of the data being received including one or more of (a) an application associated with the data, (b) a location where the application was executed, or (c) a delivery path for receiving the first and second data.

Another method for assuring data source in a system for determining abnormal behavior in a computing network defines third embodiments of the invention. The method includes validating authentication credentials from an application requesting to deliver first data related to accessing secure information from the application or second data related to performing predetermined actions on applications. The method further includes receiving, via one of web service communication or message queuing communication, the first data or second data based on the validation. The method further provides that the received first data is compared to predetermined abnormal access criteria and the second data is compared to predetermined abnormal action criteria to determine one or more abnormal behaviors.

In specific embodiments of the method, validation further includes validating authentication credentials generated by the application and receiving further includes receiving, via web service communication, the first data or second data based on the validation.

In other specific embodiments of the method, validating further includes registering the application's validation credentials with the system prior to validating and receiving further includes receiving, via message queuing communication, the first data or second data based on the validation.

An apparatus for determining abnormal behavior in a computing network provides for fourth embodiments of the invention. The apparatus includes a computing platform including at least one processor and a memory in communication with the processor. The apparatus additionally includes an abnormal behavior tracking module stored in the memory, executable by the processor and configured to determine abnormal user activity associated with applications used in a computing network. The module includes a services sub-module configured to receive first data related to accessing secure information via predetermined applications and second data related to performing predetermined actions via predetermined applications. The services sub-module includes a database configured to store the first and second data in a specified table based on a predetermined period of time, such as a calendar month or the like, associated with the receipt of the data. The module further includes an analytics sub-module configured to determine one or more abnormal behaviors based on comparing the first data to predetermined first abnormal access criteria and comparing the second data to predetermined abnormal action criteria.

In specific embodiments of the apparatus, the abnormal behavior tracking module further includes a table generation routine configured to generate a new table in the database based on occurrence of a new predetermined time period, such as a new calendar month or the like.

In other specific embodiments of the apparatus, the abnormal behavior tracking module further includes a data purge routine configured to automatically purge a specified table from the database based on a time period associated with the specified table and a predetermined time required for storage.

In still further specific embodiments of the apparatus, the database further includes a file system configured to store the first and second data in a specified file directory based on a date associated with the receipt of the data. In such embodiments of the apparatus, the abnormal behavior tracking module may further include a data purge routine configured to automatically purge a specified file directory from the file system based on a date associated with the specified file directory and a predetermined time required for storage.

In yet other specific embodiments of the apparatus, the abnormal behavior tracking module further includes a data back-up routine configured to communicate the stored first and second data to a back-up database that is configured to store the first and second data for a predetermined period of time.

Another apparatus for monitoring data attributes in a system for determining abnormal behavior in a computing network provides for fifth embodiments of the invention. The apparatus includes a computing platform including at least one processor and a memory in communication with the processor. The apparatus further includes an abnormal behavior tracking module stored in the memory, executable by the processor and configured to determine abnormal user activity associated with applications used in a computing network. The module includes a services sub-module configured to receive first data related to accessing secure information via predetermined applications and second data related to performing predetermined actions via predetermined applications. The services sub-module includes a data attribute tracking routine configured to automatically track first data attributes related to the first data and second data attributes related to the second data. The first and second data attributes are associated with at least one of (a) an origin of the data; (b) a quantity of data received or (c) a quality of data received. The services sub-module additionally includes a report generating routine configured to generate one or more reports that indicate performance of the system based on the first data attributes and second data attributes. The module also includes an analytics sub-module configured to determine one or more abnormal behaviors based on comparing the first data to predetermined first abnormal access criteria and comparing the second data to predetermined abnormal action criteria.

In specific embodiments of the apparatus, the data attribute tracking routine is further configured to track the first and second data attributes, such that the first and second data attributes are associated with the quantity of data received and include one or more of (a) an overall volume of first and second data being received, (b) a volume of first and second data being received from a specified application, or (c) a volume of first and second data being received that is associated with one or more specific users.

In other specific embodiments of the apparatus, the data attribute tracking routine is further configured to track the first and second data attributes, such that the first and second data attributes are associated the quality of data being received and include one or more of (a) a volume of first and second data being stored, (b) a volume of first and second data being rejected (c) a reason for rejecting first or second data.

In still further specific embodiments of the apparatus, the data attribute tracking routine is further configured to track the first and second data attributes, such that the first and second data attributes are associated the origin of the data being received including one or more of (a) an application associated with the data, (b) a location where the application was executed, or (c) a delivery path for receiving the first and second data.

An apparatus for assuring data source in a system for determining abnormal behavior in a computing network provides for sixth embodiments of the invention. The apparatus includes a computing platform including at least one processor and a memory in communication with the processor. The apparatus further includes an abnormal behavior tracking module stored in the memory, executable by the processor and configured to determine abnormal user activity associated with applications used in a computing network. The module includes a services sub-module configured to receive first data related to accessing secure information via predetermined applications and second data related to performing predetermined actions via predetermined applications. The services sub-module additionally includes a validation routine configured to validate authentication credentials from an application requesting to deliver the first or second data via one of web service communication or message queuing communication. The module further includes an analytics sub-module configured to determine one or more abnormal behaviors based on comparing the first data to predetermined first abnormal access criteria and comparing the second data to predetermined abnormal action criteria.

In specific embodiments of the apparatus, the validation routine is further configured to validate the authentication credentials generated by the application requesting to deliver the first or second data via web service communication. On other related specific embodiments of the apparatus, the validation routine is further configured to register the validation credentials associated with the application requesting to deliver the first or second data via message queuing communication.

A computer program product including a computer-readable medium defines seventh embodiments of the invention. The computer-readable medium includes a first set of codes for causing a computer to receive first data related to accessing secure information via predetermined applications and second data related to performing predetermined actions via predetermined applications. The computer-readable medium additionally includes a second set of codes for causing a computer to store the first and second data in a database, which is configured to store the first and second data in a specified table based on a predetermined period of time, such as a calendar month or the like, associated with the receipt of the data, Additionally, the computer-readable medium includes a third set of codes for causing a computer to determine one or more abnormal behaviors based on a comparing the first data to predetermined first abnormal access criteria and comparing the second data to predetermined abnormal action criteria.

Another computer program product including a computer-readable medium defines eighth embodiments of the invention. The computer-readable medium includes a first set of codes for causing a computer to receive first data related to accessing secure information via predetermined applications and second data related to performing predetermined actions via predetermined applications. The computer-readable medium additionally includes a second set of codes for causing a computer to automatically track first data attributes related to the first data and second data attributes related to the second data. The first and second data attributes are associated with at least one of (a) an origin of the data; (b) a quantity of data received or (c) a quality of data received. Additionally, the computer-readable medium includes a third set of codes for causing a computer to automatically generate one or more reports that indicate performance of the system based on the first data attributes and second data attributes.

Moreover, yet another computer program product including a computer-readable medium provides for ninth embodiments of the invention. The computer-readable medium includes a first set of codes for causing a computer to validate authentication credentials from an application requesting to deliver first data related to accessing secure information from the application or second data related to performing predetermined actions on applications. In addition, the computer-readable medium includes a second set of codes for causing a computer to receive, via one of web service communication or message queuing communication, the first data or second data based on the validation. Additionally, the computer-readable medium includes a third set of codes for causing a computer to determine one or more abnormal behaviors based on a comparing the first data to predetermined first abnormal access criteria and comparing the second data to predetermined abnormal action criteria.

Thus, embodiments of the invention, as described in detail below, provide for computer network security and, more specifically, monitoring application-based access to secure data and monitoring predetermined actions conducted on the applications to determine abnormal access or abnormal actions. Specific embodiments of the invention provide for an improved database for storing the monitored data. The database implements time period-structured tables and file directories, which increases the data storage and provides for automated data purging, backing-up of data and data recovery. Additional embodiments provide for tracking data attributes related to the monitored data, such as the quality of the monitored data, the quality of the monitored data and the origin of the monitored data. In addition, embodiments provide for validating the source of the monitored data to assure that data is received from a valid application.

BRIEF DESCRIPTION OF THE DRAWINGS

Figure 1:
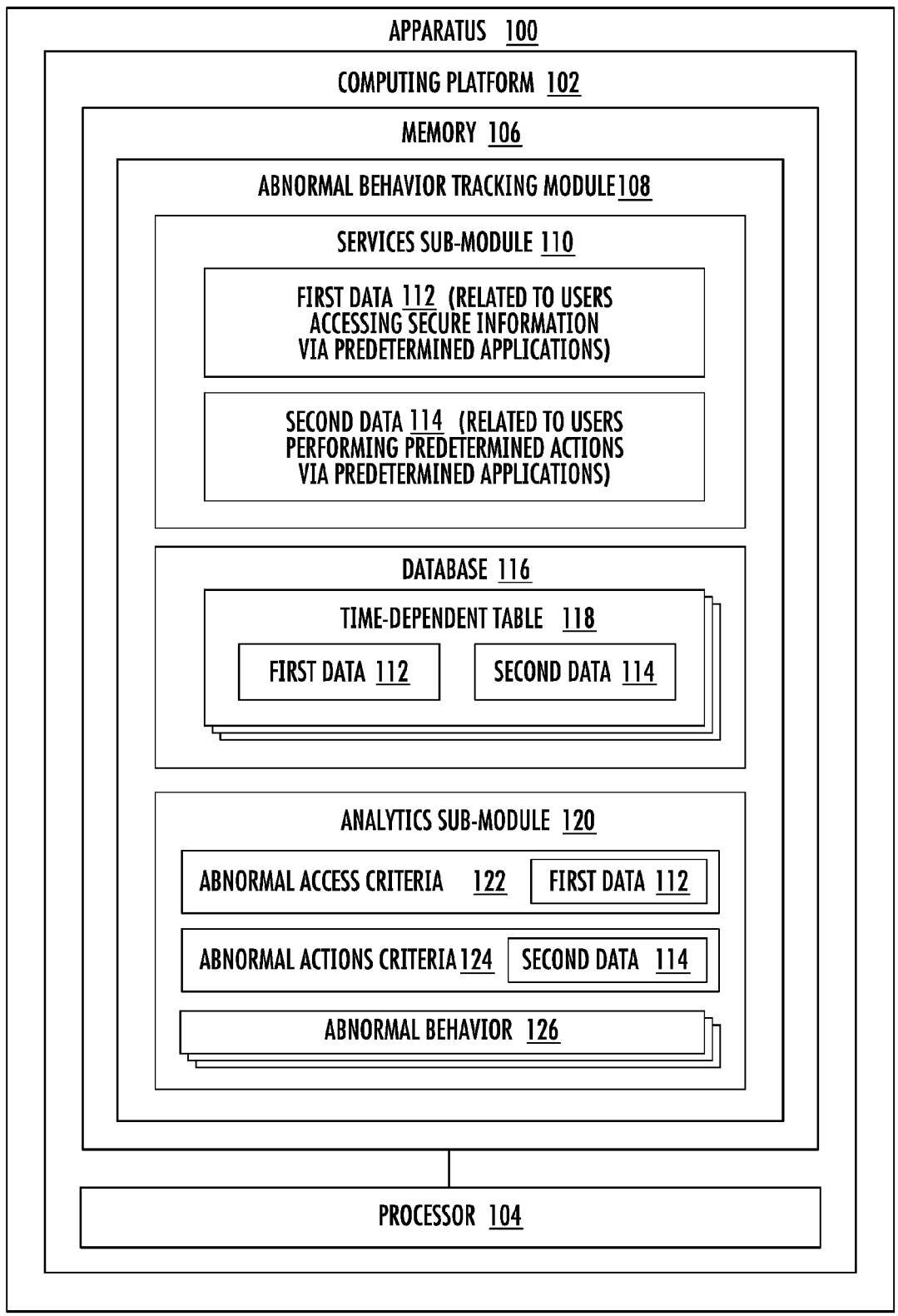

Having thus described embodiments of the invention in general terms, reference will now be made to the accompanying drawings, which are not necessarily drawn to scale, and wherein:

FIG. 1 is a block diagram of an apparatus configured for application-associated abnormal behavior tracking that implements a database with time-dependent table, in accordance with embodiments of the present invention.

Figure 2:
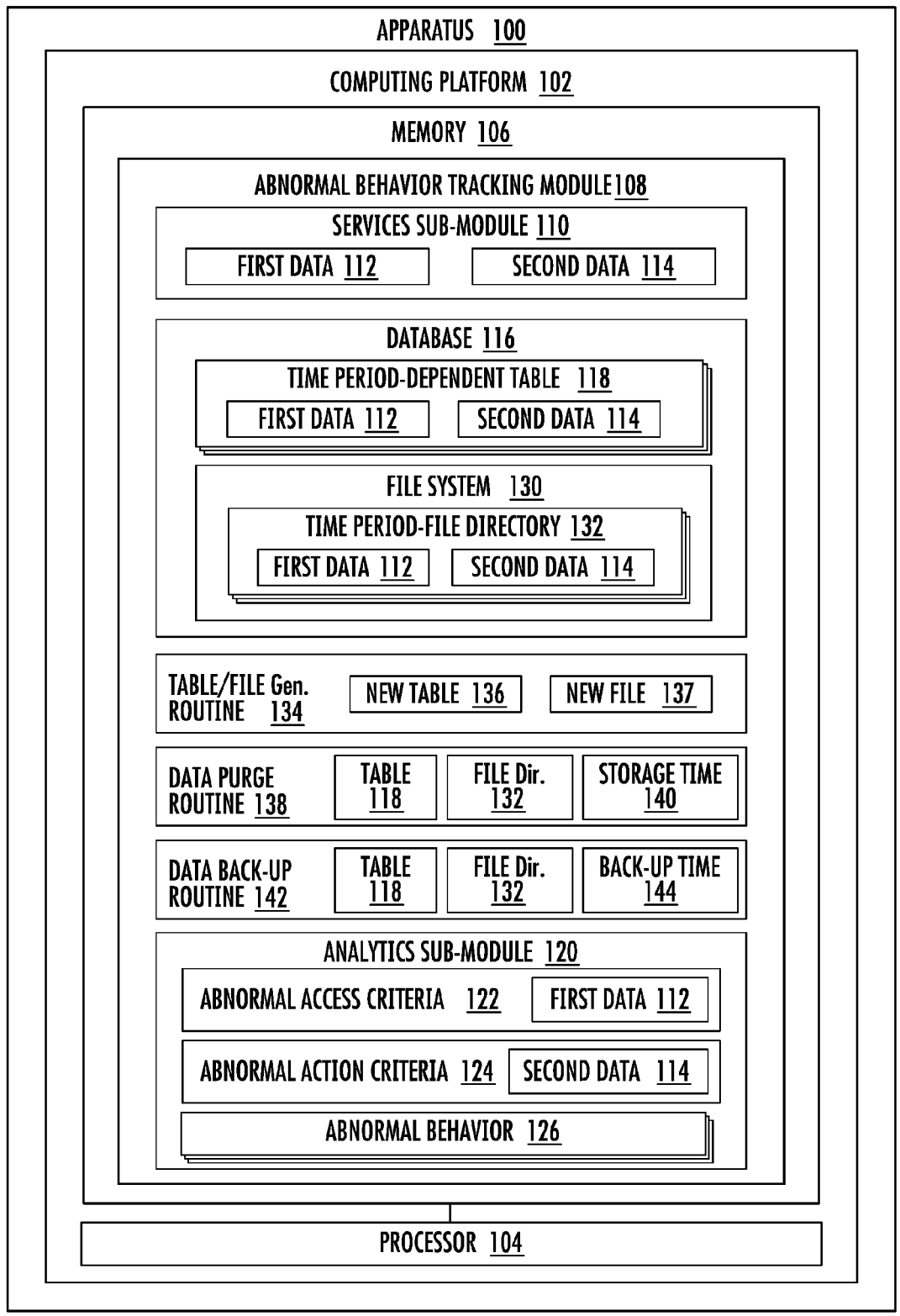

FIG. 2 is a block diagram of a more detailed apparatus configured for application-associated abnormal behavior tracking that implements a database with time-dependent table, in accordance with embodiments of the present invention.

Figure 3:
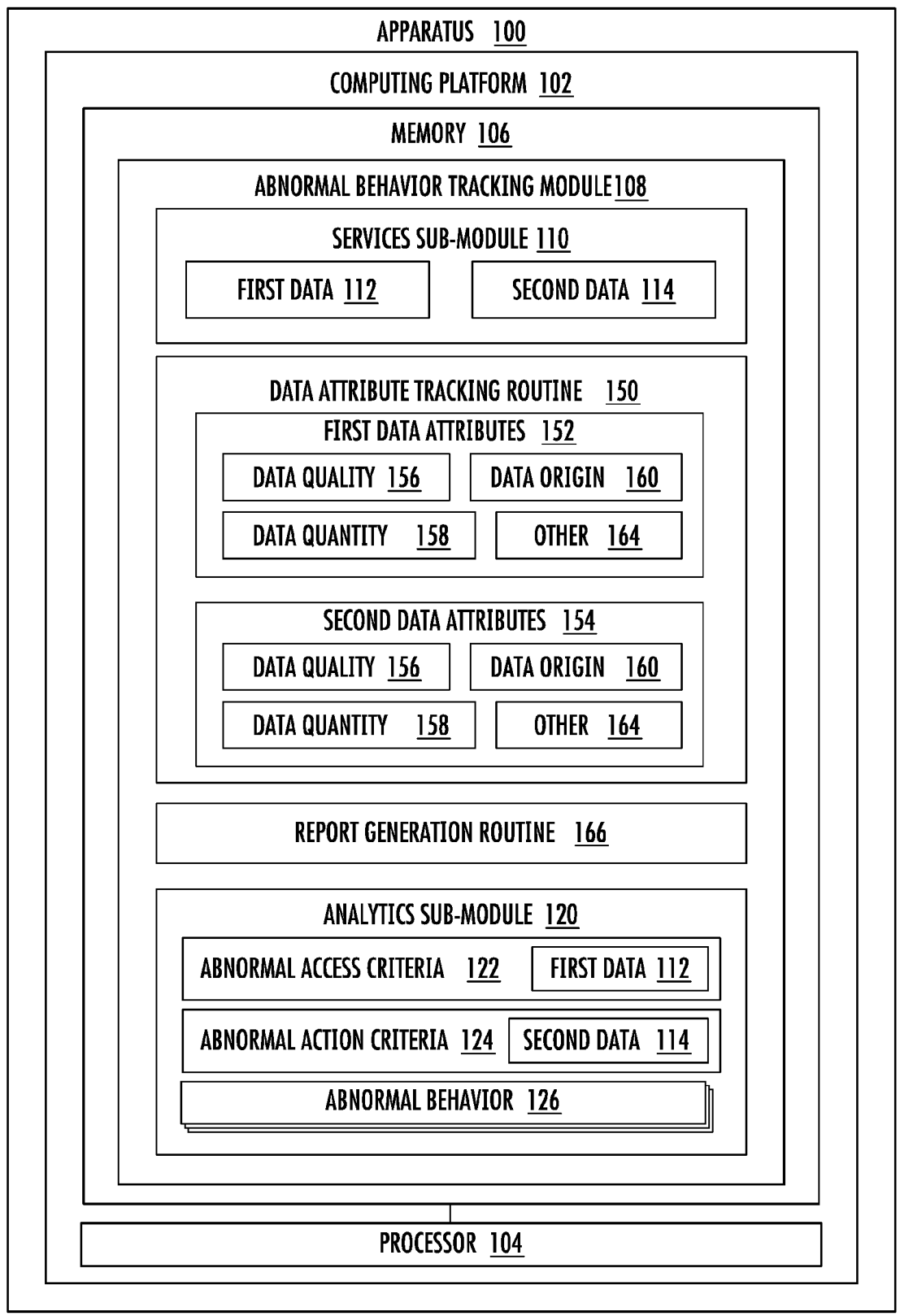

FIG. 3 is a block diagram of an apparatus configured for application-associated abnormal behavior tracking that implements data attribute tracking and reporting, in accordance with embodiments of the present invention.

Figure 4:
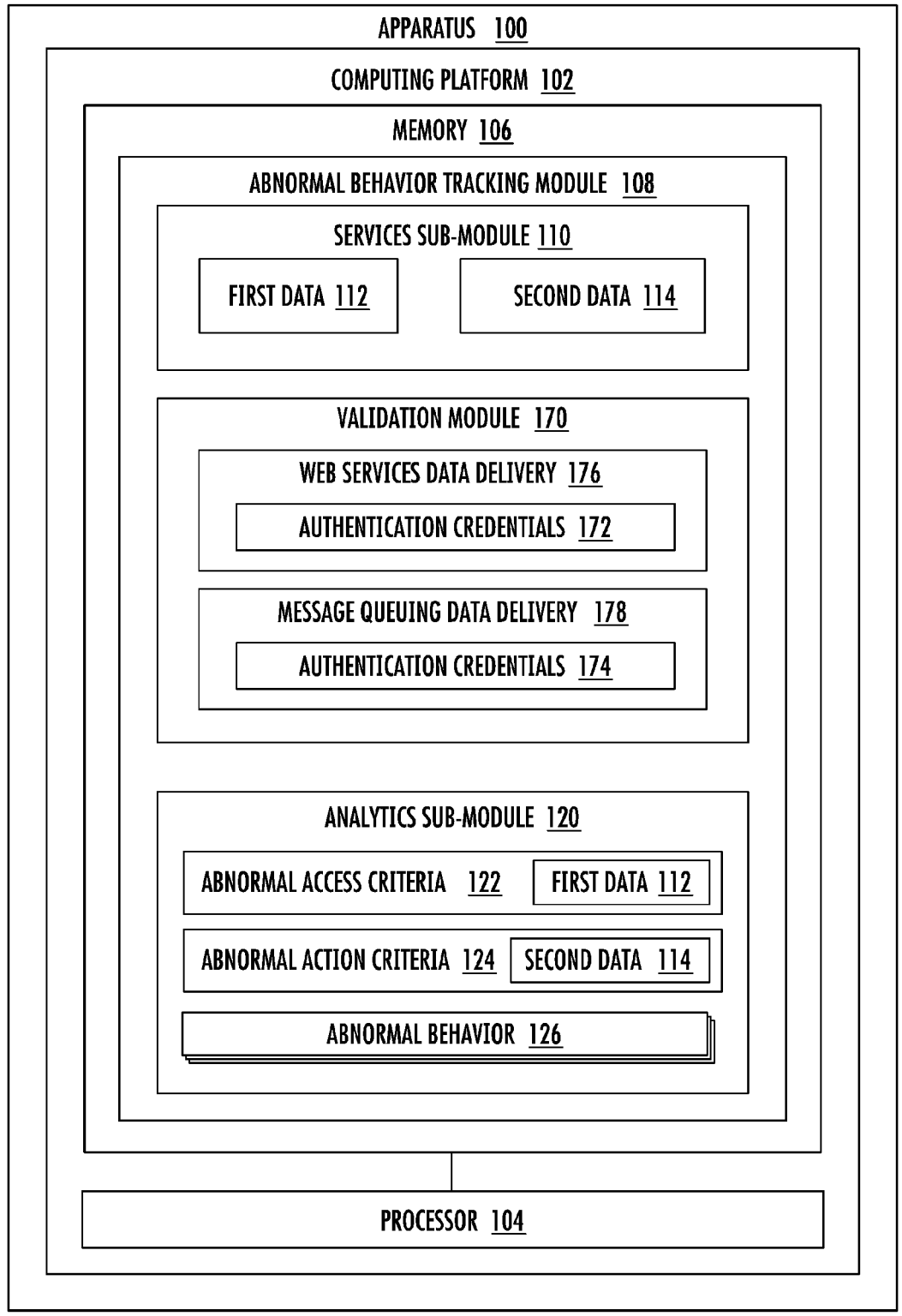

FIG. 4 is a block diagram of an apparatus configured for application-associated abnormal behavior tracking that data source validation, in accordance with embodiments of the present invention.

Figure 5:
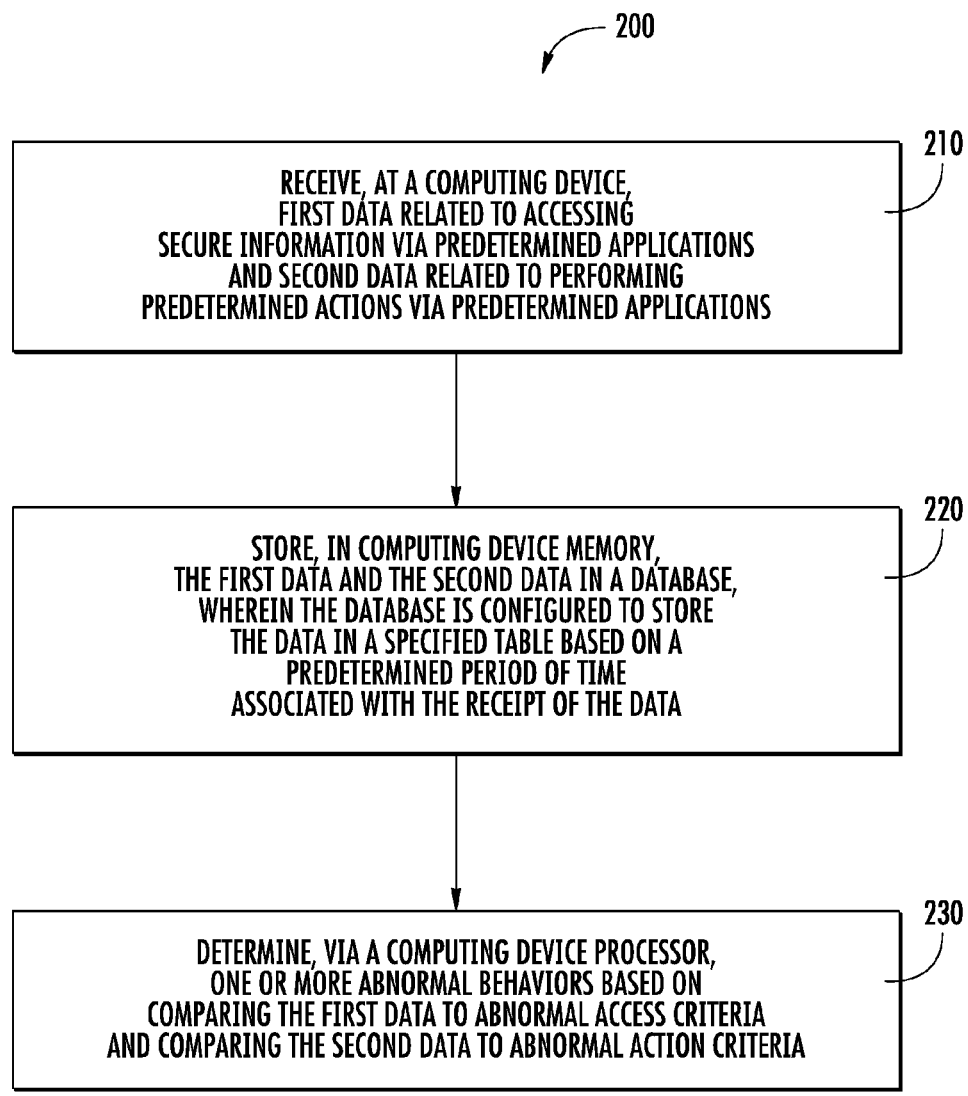

FIG. 5 is a flow diagram of a method for application-associated abnormal behavior tracking that implements a database with time-dependent table, in accordance with embodiments of the present invention.

Figure 6:
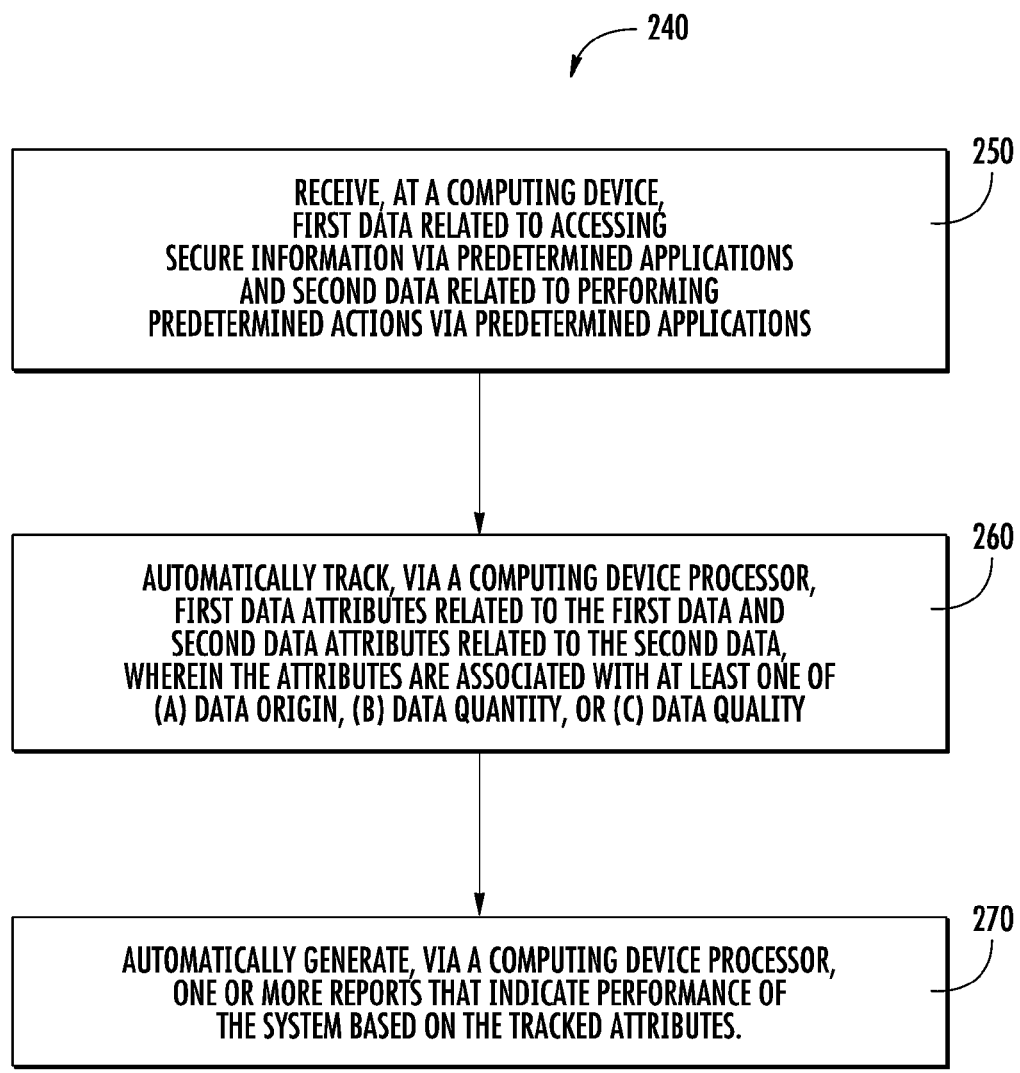

FIG. 6 is a flow diagram of a method for data attribute tracking and reporting in an application-associated abnormal behavior tracking system, in accordance with embodiments of the present invention.

Figure 7:
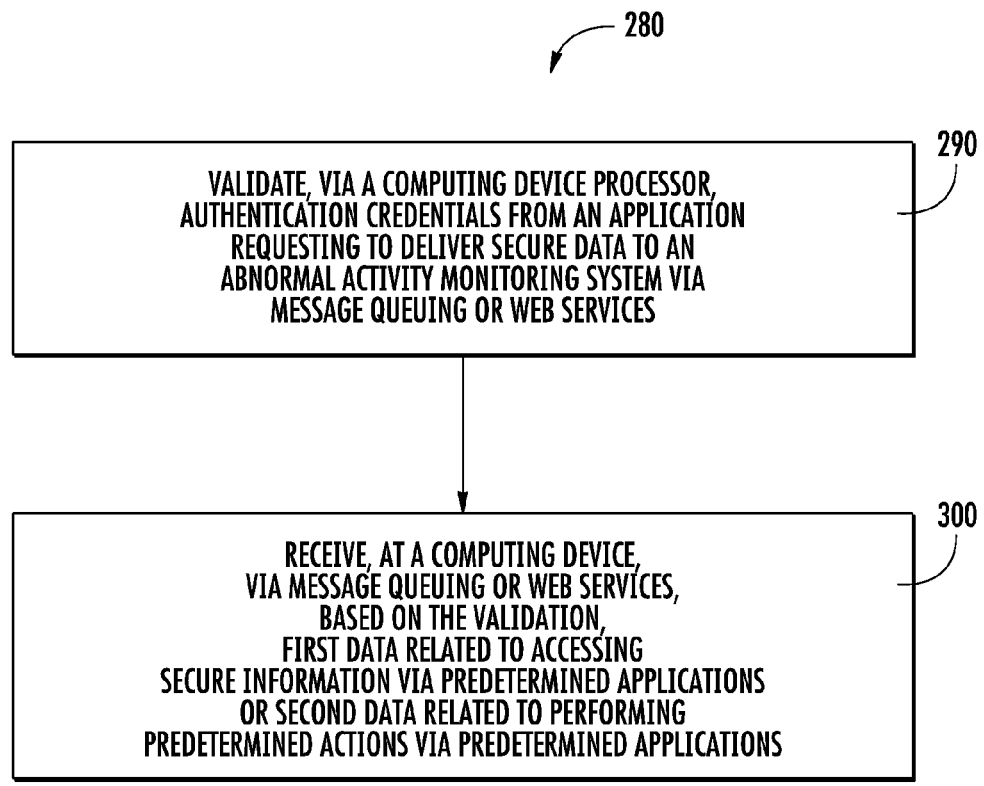

FIG. 7 is a flow diagram of a method for data source validation in an application-associated abnormal behavior tracking system, in accordance with an embodiment of the present invention.

Figure 8:
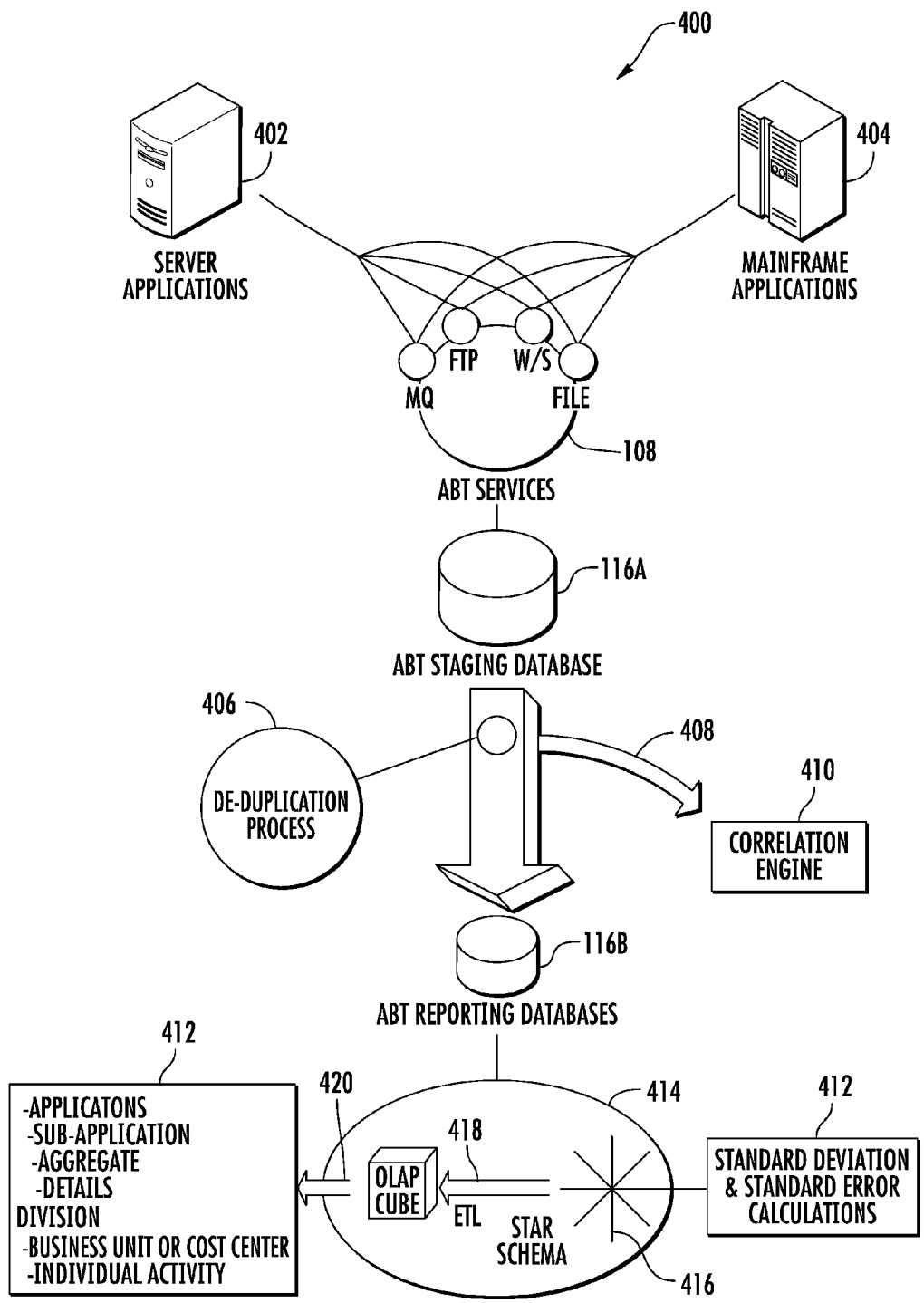

FIG. 8 is a schematic block diagram that illustrates architecture associated with a method, system and apparatus of the present invention, according to an exemplary embodiment.

Figure 9:
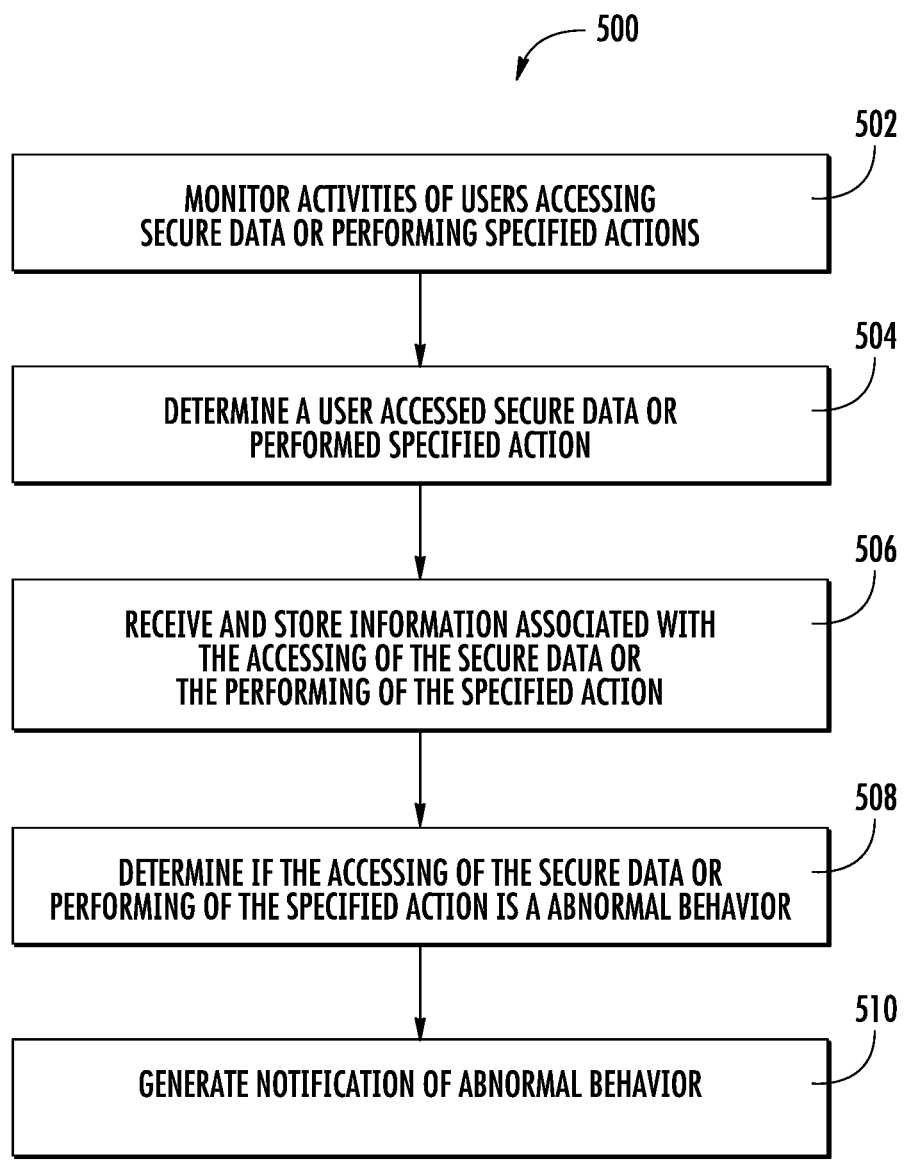

FIG. 9 is a flowchart showing general operation of a method for protecting specified data in a computing network, according to an exemplary implementation of the present invention.

Figure 10:
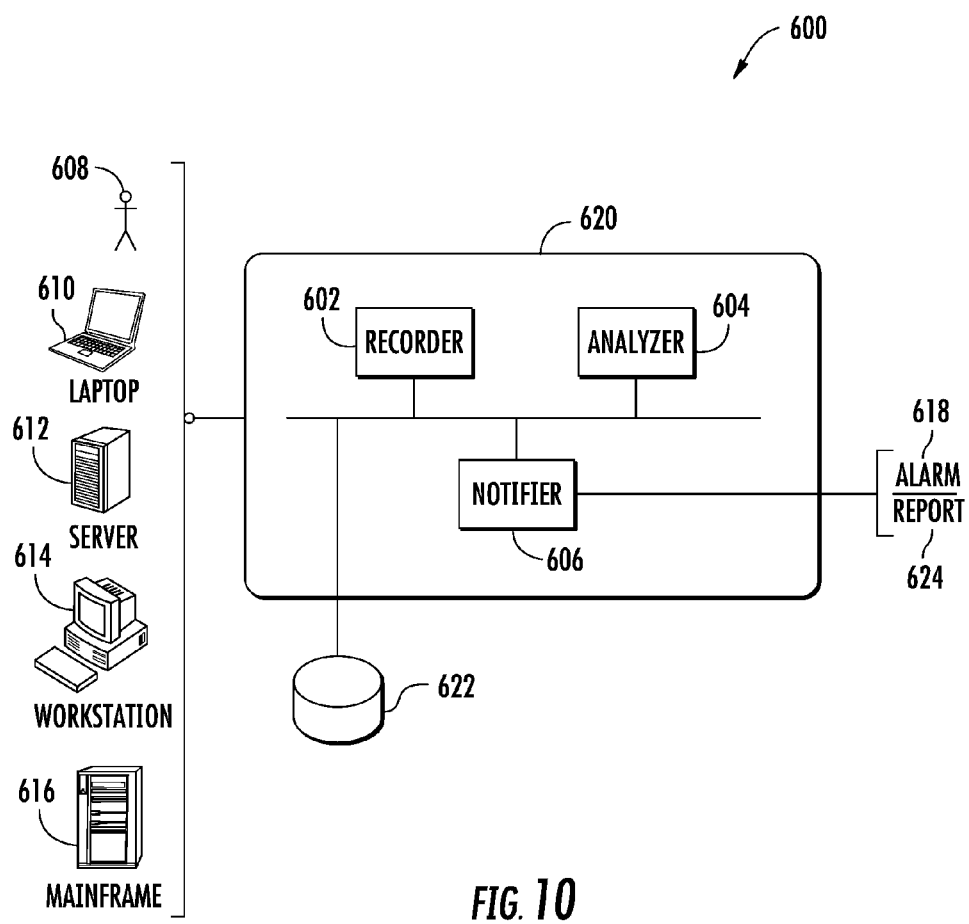

FIG. 10 is a diagram showing general operation of a system for protecting specified data in a distributed computing network, according to an exemplary embodiment of the present invention.

Figure 11:
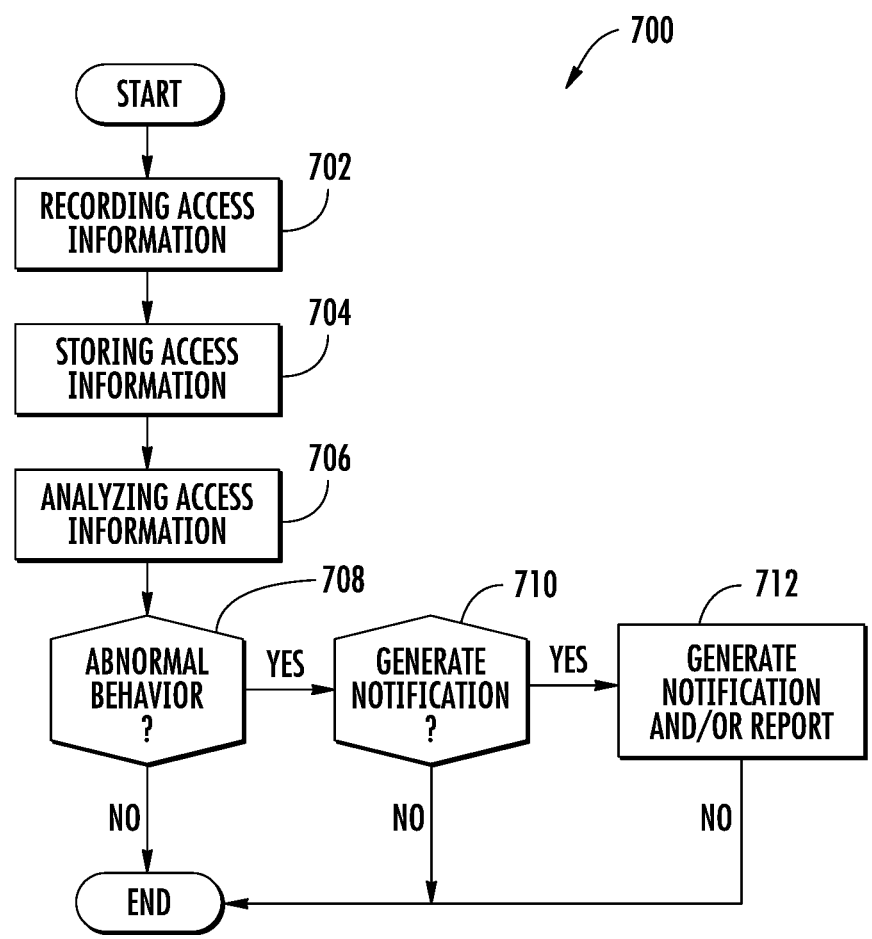

FIG. 11 is a flowchart showing general operation of a method for protecting specified data in a computing network, according to an exemplary implementation of the present invention.

FIGS. 12-15 illustrate exemplary implementations of the present application.

DETAILED DESCRIPTION OF EXEMPLARY EMBODIMENTS

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, and the like. and/or may not include all of the devices, components, modules and the like discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

The matters exemplified in this description are provided to assist in a comprehensive understanding of exemplary embodiments of the present invention described with reference to the accompanying drawing figures. Accordingly, those of ordinary skill in the art will recognize that various changes and modifications of the exemplary embodiments described herein can be made without departing from the scope and spirit of the present invention. Also, descriptions of well-known functions and constructions are omitted for clarity and conciseness. Likewise, certain naming conventions, labels and terms as used in the context of the present disclosure are, as would be understood by skilled artisans, non-limiting and provided only for illustrative purposes to facilitate understanding of certain exemplary implementations of the embodiments of the present invention.

Thus, apparatus, methods and computer-program products are herein described for improvements related to a system for tracking abnormal behavior in computer network and, specifically abnormal behavior occurring via application use. The abnormal behavior may include abnormal access to secure data stored in conjunction with an application, abnormal action taken on an application or the like. Specifically, exemplary embodiments can facilitate recognizing and preventing unauthorized access or activities by recording instances where specified data (for example, sensitive and/or non-public personal information) is accessed (for example, created, read, changed or deleted) or specific actions are performed.

The system provides comparing received data, related to accessing secure data or performing specified actions, to predetermined abnormal behavior criteria to determine if the accessing of the secure data or the performing of the specified action rises to the level of being an abnormal behavior, which would prompt further investigative actions.

Exemplary implementations of the present invention provide a method, system and apparatus for collecting event activity information on a computer network where the information can be used to identify unauthorized activity and provide evidence in legal actions against the perpetrators. The security mechanisms, as disclosed by exemplary implementations of the present invention, support protecting integrity of the collected information logs in transit and during storage. Specifically, exemplary implementations of the present invention can be used to ensure the admissibility of the collected information as evidence in legal proceedings.

According to specific embodiments, improvements to the abnormal behavior tracking system, herein described and claimed, relate to a scalable database implemented in conjunction with the abnormal behavior tracking system. The database provides for data to be scored in tables which are based on predetermined time period in which the data was received, for example, calendar month tables or the like. Such time-based tables are instrumental in assuring requirements related to proper data purge, data back-up and/or data recovery.

Further improvements to the abnormal behavior tracking system, herein described and claimed, relate to data attribute tracking, in which attributes related to the received data (i.e., data related to access of secure data and/or data related to performing specified actions) to tracked and report. The data attributes may pertain to the source/origin of the data, the quantity of the data, the quality of the data or any other attributes that may benefit the overall management of the abnormal behavior tracking system.

Additional improvements to the abnormal behavior tracking system, herein described and claimed, relate to validating the source of received data (i.e., data related to access of secure data and/or data related to performing specified actions). Validating the source of the data assures that the data is coming from where the data says it is coming from and that it is not being spoofed from another non-validated, non-authenticate source.

Referring to FIG. 1 a high-level block diagram is provided of an apparatus 100 configured for abnormal behavior tracking, which implements a database having time-dependent tables, in accordance with an embodiment of the present invention. The apparatus 100 includes a computing platform 102 having at least one processor 104 and a memory. The memory 106 stores abnormal behavior tracking module 108 that is configured to monitor abnormal behavior related to computer applications, such as abnormal access to secure application data, abnormal actions taken via the applications or the like. The abnormal behavior tracking module of the present invention is especially suited for use in a business environment, in which users, such as employees/associates, or the like have access to secure data. For the purposes of this invention "users" can also refer to non-human entities, such as network devices or other applications. One such example, of a business environment is a financial institution, in which employee/associates readily have access to secure customer data and have the capability to perform predetermined actions, which may be restricted, forbidden or otherwise illegal. The predetermined actions that are monitored and tracked will vary based on the entity implementing the abnormal behavior tracking module 108.

Abnormal behavior tracking module 108 includes services sub-module 110 which is configured to receive or otherwise collect first data 112 related to accessing secure information via predetermined applications and second data 114 related to performing predetermined actions via predetermined applications. In specific embodiments of the invention, the abnormal tracking module 108 integrates or otherwise interfaces with the predetermined applications such that user access to secure data or user performance of a predetermined action triggers automatic electronic notification of the event to the services sub-module 110 of the abnormal behavior tracking module 108. Additionally, the services sub-module 110 may be configured to transform, reformat or otherwise process the first and second data for subsequent analytical analysis, which determines whether the access to the secure data or the predetermined action rises to the level of an abnormal behavior.

In addition, abnormal behavior tracking module 108 includes a database 116 that stores the first data and the second data. The database includes tables 118 which are associated with a specific predetermined period of time for receiving the data. For example, each table is associated with a specific calendar month, and the first and second data 112, 114 that is received during the associated month is stored in corresponding month's table 118. By providing for tables 118 which are associated with a specific period of time, scalability of the database is achieved and better automated management of data purge, data back-up and data recovery can be realized.

Additionally, abnormal behavior tracking module 108 includes analytics sub-module 120 that is configured to determine abnormal behavior 126 based on a comparison of first data 112 to abnormal access criteria 122 and a comparison of second data 114 to abnormal action criteria 124. The abnormal access criteria 122 and abnormal action criteria 124 may take into account what is "normal" access or action for a specific user or what is "normal" access or action for a user's peers (i.e., employees/associates in the same or similar role or having the same or similar job responsibilities). "Normal" access or activity takes into account user responsibilities, job/role responsibilities, other factors that create a need to access secure data or perform an activity and the like. In addition, the first and second data 112, 114 being used to determine abnormal behaviors 126 takes into account access or action trends or patterns exhibited by a user of a period of time. Once an abnormal behavior 126 is generated notification may automatically be communicated to designated parties to notify the same of the need to further investigate the abnormal behavior 126.

FIG. 2 provides a more detailed depiction of the apparatus 100, according to further embodiments of the present invention. In addition to providing greater detail, FIG. 2 highlights various alternate embodiments. The apparatus 100 may include any type of one or more computing devices, such as servers, personal computers, or the like. The computing platform 102 is operable to receive and execute tools, modules, routines and applications, such as abnormal behavior tracking module 110 and the like. Computing platform 102 includes memory 106, which may comprise volatile and nonvolatile memory such as read-only and/or random-access memory (RAM and ROM), EPROM, EEPROM, flash cards, or any memory common to computer platforms. Further, memory 106 may include one or more flash memory cells, or may be any secondary or tertiary storage device, such as magnetic media, optical media, tape, or soft or hard disk.

Further, computing platform 102 also includes processor 104, which may be an application-specific integrated circuit ("ASIC"), or other chipset, processor, logic circuit, or other data processing device. Processor 104 or other processor, such as ASIC, may execute an application programming interface ("API") layer (not shown) that interfaces with any resident programs, such as abnormal behavior tracking module 108 or the like stored in the memory 106 of the apparatus 100.

Processor 104 may include various processing subsystems (not shown) embodied in hardware, firmware, software and combinations thereof, that enable the functionality of apparatus 100 and the operability of the computing device on a network. For example, processing subsystems may allow for initiating and maintaining communications, and exchanging data, with other networked devices.

As previously noted in relation to FIG. 1, the memory 106 stores abnormal behavior tracking module 108 that is configured to monitor abnormal behavior related to computer applications, such as abnormal access to secure application data, abnormal actions taken via the applications or the like. Abnormal behavior tracking module 108 includes services sub-module 110 which is configured to receive or otherwise collect first data 112 related to accessing secure information via predetermined applications and second data 114 related to performing predetermined actions via predetermined applications. In addition, abnormal behavior tracking module 108 includes a database 116 that stores the first data and the second data. The database includes tables 118 which are associated with a specific predetermined period of time for receiving the data. For example, each table is associated with a specific calendar month, and the first and second data 112, 114 that is received during the associated month is stored in the corresponding month's table 118.

In additional embodiments of the apparatus, the database 116 of abnormal behavior tracking module 108 includes a file system 130 having file directories 132 which are associated with a specific period of time for receiving the data. For example, each file directory is associated with a specific date, and the first and second data 112, 114 that is received during the associated date is stored in the corresponding date's file directory 132. By providing for file directories 132 which are associated with a specific period of time, scalability of the database is achieved and better automated management of data purge, data back-up and data recovery can be realized.

Additionally, alternate embodiments of apparatus 100 provide for abnormal behavior tracking module 108 to include table/file generation routine 134 which is configured to automatically generate a new table 136 or a new file directory 137 based on occurrence of a new predetermined time period, such as a new calendar month for generation of a new table 136 and a new date for generation of a new file directory 137. Automatic generation of the new table 136 and new file directory 137 provides for tables and file directories to be generated on-the-fly without the need for manual intervention.

In addition, alternate embodiments of apparatus 100 provide for data purge routine 138 that is configured to automatically purge data from database 116 based on a predetermined required storage time 140. For example, if the predetermined required storage time 140 is two years, the data purge routine 138 may be configured to purge, on a daily basis, the file directory 118 that is more than two years old. Similarly, the data purge routine 138 may be configured to purge, on a monthly basis, the table 118 that is more than two years old. Automated purging of data from database 116 assures that the data is properly purged and that the predetermined required storage time 140 is always maintained.

Additionally, in other alternate embodiments of apparatus 100, the abnormal behavior tracking module 108 may include data back-up routing 142 that is configured to automatically back-up data from database 116 based on a predetermined required back-up time 142. For example, the predetermined back-up time for file directories 132 may be daily and the predetermined back-up time for tables may be monthly. In specific embodiments of the invention, storage requirements may exist, such that data is made available online for a prescribed period, for example two year and is stored offline for an additional prescribed period, for example, three years. Automated backing-up of data from database 116 assures that the data is properly backed up in the event that data in the database becomes corrupt, deleted or otherwise in accessible.

As previously noted, abnormal behavior tracking module 108 includes analytics sub-module 120 that is configured to determine abnormal behavior 126 of employees/associates based on a comparison of first data 112 to abnormal access criteria 122 and a comparison of second data 114 to abnormal action criteria 124. In addition to monitoring the behavior of employees/associates in regards to accessing secure data and performing predetermined actions via applications, in alternate embodiments of the present invention, the abnormal behavior tracking module 108 may be additionally configured to monitor the access of users of the abnormal tracking module 108 (otherwise referred to as module administrators) and/or the performance of actions by users of the abnormal tracking module 108. First and second data 112, 114 may include data that is secure or provide for access to secured data, as such a need exists to further protect secure data and/or monitor the actions taken by users of the abnormal tracking module 108. By monitoring the access that users are provided to the abnormal behavior tracking module 108 and/or the actions performed by users on the abnormal behavior tracking module 108, protection is afforded against module users obtaining secure data or access to secure data from the abnormal behavior module 108 as opposed to from one of the enterprise/business applications.

Turning the reader's attention to FIG. 3 a block diagram is depicted of apparatus 100 in which the abnormal behavior tracking module 108 includes a data attribute tracking routine 150, in accordance with alternate embodiments of the present invention. The data attribute tracking routine is configured to automatically track first data attributes 152 related to the first data 112 and second data attributes 154 related to the second data 114. The first and second data attributes 152, 154 are associated with one or more of the quality of the data 156, the quantity of the data 158, the origin of the data 160 or any other attribute data as required by the entity implementing module 108. The data attributes may be stored in database 116 (shown in FIGS. 1 and 2) or in separate database.

Data attributes 152, 154 associated with the quality of the data 156 may include, but are not limited to, the volume of first and second data being stored in database 116 versus the total volume of first and second data received, the volume of first and second data being rejected, the reason for rejecting first and/or second data and the like. Data attributes associated with the quality of data 156 provide for assessing and monitoring module 108 performance and provide for an indication of a need to address performance issues.

Data attributes 152, 154 associated with the quantity of data 158 may include, but are not limited to, the overall volume of first and/or second data received over a predetermined time period, the volume of first and/or second data received from or associated with a specific application, the volume of first and second data associated with a specific associate/employee or group of employees/associates and the like.

Data attributes 152, 154 associated with the origin of the data 160 may include the application associated with the first or second data, the physical or network location where the application was located, the delivery path for receiving the first or second data, the delivery mechanism for receiving the first or second data, when the first or second data was delivered, how the data was stored when received and the like. In certain instances, such as when the data is subsequently used for evidentiary purposes in a legal proceeding or the like, the origin of the data and related information is necessary for proving the authenticity of the data.

Additionally, abnormal behavior tracking module 108 may include report generation routine 166 which is configured to automatically, or at the bequest of a module user, generate data attribute reports 168 that are electronically communicated to designated individuals or entities within the business/enterprise.

FIG. 4 is a block diagram of apparatus 100 in which the abnormal behavior tracking module 108 includes a validation module 170, in accordance with alternate embodiments of the present invention. The validation module is configured to validate authentication credentials 172, 174 from an application requesting to deliver the first or second data 112, 114 via one of web service data delivery 176 or message queuing (MQ) data delivery 178. Validation of the application assures that the data is being delivered from a validated source/application and not from non-validated source/application (e.g., data being spoofed or the like).

In embodiments in which a specified application, which is being monitored for access to secure data or performance of specified actions, implements web services for delivery of first data or second data to the abnormal behavior tracking module 108, the authentication credentials 172 may be internally generated by the application. Prior to delivery of first or second data, the application communicates the authentication credentials 172 to the validation module 170, which in turn validates the application for delivery via web services.

In embodiments in which a specified application, which is being monitored for access to secure data or performance of specified actions, implements message queuing (MQ) for delivery of first or second data to the abnormal behavior tracking module 108, the authentication credentials 174 may be pre-registered by an application owner. In such embodiments, the abnormal behavior tracking module 108 may include a registration user interface (not depicted in FIG. 4) which provides for the application owner or another entity affiliated with the application to register the application prior to data delivery. Registration may include, but is not limited to, information on how data is to be delivered, how often data is to be delivered, what kind of data is to be delivered, the types of actions that are to be monitored and other related information. Registered information serves as the authentication credentials 174, such that when data is received from a message queue, the validation routine 170 will determine the origin of the data, the means be which the data was delivered and the like and compare the determined features to the registered information for the purpose of validating the application.

Referring to FIG. 5 a flow diagram is presented of a method 200 for abnormal behavior tracking implementing a database having time-dependent table, in accordance with an embodiment of the present invention. At Event 210, first data related to accessing secure information via predetermined applications and second data related to performing predetermined actions via predetermined applications is received or otherwise collected. In specific embodiments of the invention, the abnormal behavior tracking mechanism integrates or otherwise interfaces with the predetermined applications such that access to secure data or performance of a predetermined action triggers automatic electronic notification of the event. As previously noted, accessing of secure data and/or performing a predetermined action may be performed by a human, such as an associate/employee or by a non-human entity, such as a specific device or application.

At Event 212, the first and second data are stored in a database that is configured to store the data in a specified table based on a predetermined time period associated with the receipt of the data. In specific embodiments of the method, the predetermined time period is a calendar month or the like. As such, in further embodiments, the method may include automatically generating and deploying a new table based on the occurrence of a new predetermined time period, such as occurrence of a new calendar month or the like.

Additionally, in other embodiments of the method, the first and second data are stored in a file system, which is configured to store the first and second data in a specified file directory based on a date associated with the receipt of the data. In related embodiments, the method may also include purging a specified table and/or file directory from the database or file system based on a predetermined time period for purging and the time period or date associated with the table or specified file directory. Moreover, the method may include communicate the stored first and second data to a back-up database, which is configured to store the first and second data for a predetermined period of time.

At Event 230, one or more abnormal behaviors are determined based on comparing the first data to abnormal access criteria and/or comparing the second data to abnormal action criteria. The abnormal access criteria and abnormal action criteria may take into account what is "normal" access or action for a specific user, device or application or what is "normal" access or action for a user's peers (i.e., employees/associates in the same or similar role or having the same or similar job responsibilities), similar devices and/or similar applications. "Normal" access or activity takes into account user responsibilities, job/role responsibilities, other factors that create a need to access secure data or perform an activity and the like. In addition, the first and second data being used to determine abnormal behaviors takes into account access or action trends or patterns exhibited by a user of a period of time. In additional embodiments of the method, once an abnormal behavior is generated notification may automatically be communicated to designated parties to notify the same of the need to further investigate the abnormal behavior.

Referring to FIG. 6 a flow diagram is depicted of a method 240 for abnormal behavior tracking including tracking data attributes, in accordance with embodiments of the present invention. At Event 230, first data related to accessing secure information via predetermined applications and second data related to performing predetermined actions via predetermined applications is received or otherwise collected. In specific embodiments of the invention, the abnormal behavior tracking mechanism integrates or otherwise interfaces with the predetermined applications such that access to secure data or performance of a predetermined action triggers automatic electronic notification of the event. As previously noted, accessing of secure data and/or performing a predetermined action may be performed by a human, such as an associate/employee or by a non-human entity, such as a specific device or application. The first and second data is subsequently implemented to determine one or more abnormal behaviors by comparing the first data to abnormal access criteria and/or comparing the second data to abnormal action criteria.

At Event 260, first data attributes related to the first data and second data attributes related to the second data are automatically tracked. The data attributes are associated with at least one of data origin, data quantity, data quality or the like.

Data attributes associated with the origin of the data may include (1) the application associated with the first or second data, (2) the physical or network location where the application is executed, (3) the delivery path for receiving the first or second data, (4) the delivery mechanism for receiving the first or second data, (5) when the data was delivered, (6) how the data was stored when received and the like. In certain instances, such as when the data is subsequently used for evidentiary purposes in a legal proceeding or the like, the origin of the data and related information is necessary for proving the authenticity of the data.

Data attributes associated with the quantity of data may include, but are not limited to, (1) the overall volume of first and/or second data received over a predetermined time period, (2) the volume of first and/or second data received from or associated with a specific application, (3) the volume of first and second data associated with a specific associate/employee or group of employees/associates or device/application and the like.

Data attributes associated with the quality of the data may include, but are not limited to, (1) the volume of first and second data being stored in database versus the total volume of first and second data received, (2) the volume of first and second data being rejected, (3) the reason for rejecting first and/or second data and the like. Data attributes associated with the quality of data 156 provide for assessing and monitoring module 108 performance and provide for an indication of a need to address performance issues.

At Event 270, one or more reports are automatically generated and communicated to identified individuals or entities. The reports indicate performance of the abnormal behavior tracking system based on the tracked attributes. In additional embodiments of the method, the data attributes associated with the origin of the data may be required for evidentiary purposes to verify the authenticity of the data or the like.

FIG. 7 depicts yet another flow diagram of a method for validating an application for data delivery in an abnormal behavior tracking system, in accordance with further embodiments of the present invention. At Event 290, authentication credentials from an application requesting to deliver data to an abnormal behavior tracking system are validated. In those embodiments in which the delivery mechanism is messaging queuing the authentication credentials may be associated with data inputted during an application registration procedure. In other embodiments in which the delivery mechanism is web services the authentication credentials may be internally generated by the application requesting data delivery. Validation of the application assures that the data is being delivered from a validated source/application and not from non-validated source/application (e.g., data being spoofed or the like).

At Event 300, first data related to accessing secure information via predetermined applications and second data related to performing predetermined actions via predetermined applications is received or otherwise collected based on the validation.

FIG. 8 is a schematic block diagram that illustrates an architecture of a system 400 according to an exemplary embodiment of the present invention for monitoring specified secure data in a distributed computing network, wherein internal and external entities (for example, human and/or automated) from various sources access specified secure data, such as non-public personal information or the like. For example, users, such as employees/associates, devices or applications can access secure data using a Web interface via server 402. Other entities can access secure data via a mainframe 404. For example, in the financial institution example, an associate/employee or the like can request loan history information via a mainframe 404. On the other hand, an associate/employee or the like can access secure data using a server 402, for example, using a Web site or any software application interacting with the server 402 accessing secure data. Upon request to access secure data, server 402 and/or mainframe 404 applications are monitored and maintained by abnormal behavior tracking module 108 through services such as Message Queuing (MQ), File Transfer Protocol (FTP), Web Services (W/S), file or the like, interacting with the abnormal behavior tracking staging database 116A. The abnormal behavior tracking module is configured to, among other functions, receive first and second data, parse the content of the data, apply business rules, calculate hash values, insert data into abnormal behavior tracking staging database 116A, where the data may be persisted to disk at any step in case of system failure.

Thereafter, data from the staging database 116A is processed and transferred to the abnormal behavior tracking reporting databases 116B. The processing and transfer may include detecting for duplication processing 406 where duplicative information is flagged or deleted, and correlation 408 of rules for activities based upon events (using, for example, a correlation engine 410). According to exemplary implementations, additional processing can be performed upon storing in the abnormal behavior tracking reporting databases 116B, including, but not limited to, statistical calculations for standard deviation and standard error 412 and providing reports 412 for application and business units 414, wherein detail access information is stored 416, information is aggregated into an OLAP (OnLine Analytical Process) cube 418, and finally the aggregated data and statistically calculated information is provided for reporting, cross-tabulation, and automated alerting 420.

FIG. 9 is a flowchart showing general operation of a method 500 for protecting specified data in a distributed computing network, according to an exemplary embodiment of the present invention.

In the example of FIG. 9, the method 500 implemented in the network includes, at Event 502, monitoring information related to activities of a plurality of users (e.g., associated/employees, devices, applications or the like) accessing specified secure data via an application or performing specified application actions, at Event 504, determining whether the user accessed the specified secure data or performed the specified action, at Event 506 receiving and storing the information (i.e., first data or second data) related to the activities of the accessing the specified secure data or performing specified actions, at Event 508 determining if the accessing of the secure data or performing of the actions are abnormal behavior and, at Event 510 generating and communicating a notification indicating that an abnormal behavior has occurred.

Exemplary implementations of the present invention provide for monitoring that comprises recording, for instances of accessing specified data and/or performing specified action, any one, or combination, of data, including the time of the access/action, application identifier, user identification and device/hardware identifier. The data is recorded each time that a user views the specified secure data, logs into a registered application, logs out of the registered application, changes application privileges or attempts and fails to log into the registered application.

According to further exemplary implementations, monitoring includes monitoring a data stream relating to the activities of user(s) accessing the specified data; and, optionally, measuring the information related to activities of the user(s) accessing the specified data. For example, the measured information can be related to activities at the application layer.

In the case where it may be desirable to provide notification of abnormal behavior related to accessing secure data or performing a specified action, an alert (for example visual, audible, or both) can be generated, for example in conjunction with a report indicating that an abnormal behavior has occurred. According to exemplary implementations of the present invention, the alert can comprise any one, or a combination, of a real time alert, an indicator indicating that the at least one user has incurred abnormal behavior, a post-event (i.e., accessing of secure data or performing specified action) report including information regarding the event, or indication of actions taken during the event. Furthermore, the alerts (e.g., format and/or method of delivery thereof) can be customized to address specific needs of the system and environment where it is deployed.

In addition rules can be implemented for monitoring to determine if an access has occurred or if a specified action has occurred. In specific embodiments, such rules can include a set of parameters indicative of the information or type of access to be monitored. Further, such rules may provide for event logging structure and methodology, formatting the look and content of data, maintaining (e.g., re-formatting and/or deleting) of the specified data, detecting duplication of selected data and data delivery. Furthermore, any of the rules can be customized to address specific needs of the system and environment where it is deployed, and can also be customized to be data content specific.

Determining if access or a specified action is abnormal behavior can be based on rules for measuring access to the specified data or performing the specified actions. The rules can be peer-based rules or rules specific to the user based on historical access or performance of actions.

Any notifications (such as alerts, report, and the like) generated when an anomalous behavior is determined can be customized, for example to be generated at specified times and provide specified content.

Methodology according to exemplary embodiments of the present invention is also customizable for implementation at any application. Further, monitoring of access to specified data includes remote or local access by either a human operator or a machine enabled system.

FIG. 10 is a diagram showing general operation of a system for monitoring access to specified data in a distributed computing network 300, according to an exemplary embodiment of the present invention.

As shown in FIG. 10 an exemplary system 600 monitors access to specified secure data and performance of specified actions in a distributed computing network, the system 600 comprising a recorder 602 for recording information indicative of access activity to specified application-related data or performance of specified action for a plurality users 608 accessing specified data from any one of exemplary systems 610-616. The system provides a storage 622 for retaining gathered access activity (i.e., first data) or action activity (i.e., second data) information, and an analyzer 604 for analyzing access activity information or action activity data to determine if an abnormal behavior has occurred. Further, the system may include a notifier 610 for generating a real-time notification/alarm 618 and/or historical report(s) 612, including information indicative of an abnormal behavior.

According to exemplary implementations of the present invention access activity can include any one of creating, reading, changing or deleting of specified data. Conversely, access activity information can comprise information related to the data that was accessed, who (or what device) accessed the data, when the data was accessed and indication of rule(s), examples of which are described above, that were used for measuring access activity.

FIG. 11 is a flowchart showing general operation of a method 700 for protecting specified secure data and assuring against specified actions in a distributed computing network, according to an exemplary implementation of the present invention.

As shown in FIG. 11, at Event 702, access activity information of specified secure data and/or specified actions is recorded S401 and, at Event 704 the information is received and stored for subsequent evaluation, or evidentiary purposes. At Event 706, the recorded information is analyzed to evaluate access activity of a user or the actions of the user, and determine, at Decision 708, whether the user has incurred abnormal behavior. Subsequently, at Decision 710, a determination is made a notification of abnormal behavior is necessary based on the determination at Event 708. If a notification is necessary, at Event 712, a real-time or historic (for example, previously scheduled) notification can be selectively generated, including information indicative of access activity to specified secure data or performance of a specified action. Likewise, a report comprising information indicative of the access activity to specified data can be generated according to a specified (or a default) format.

Figure 12:
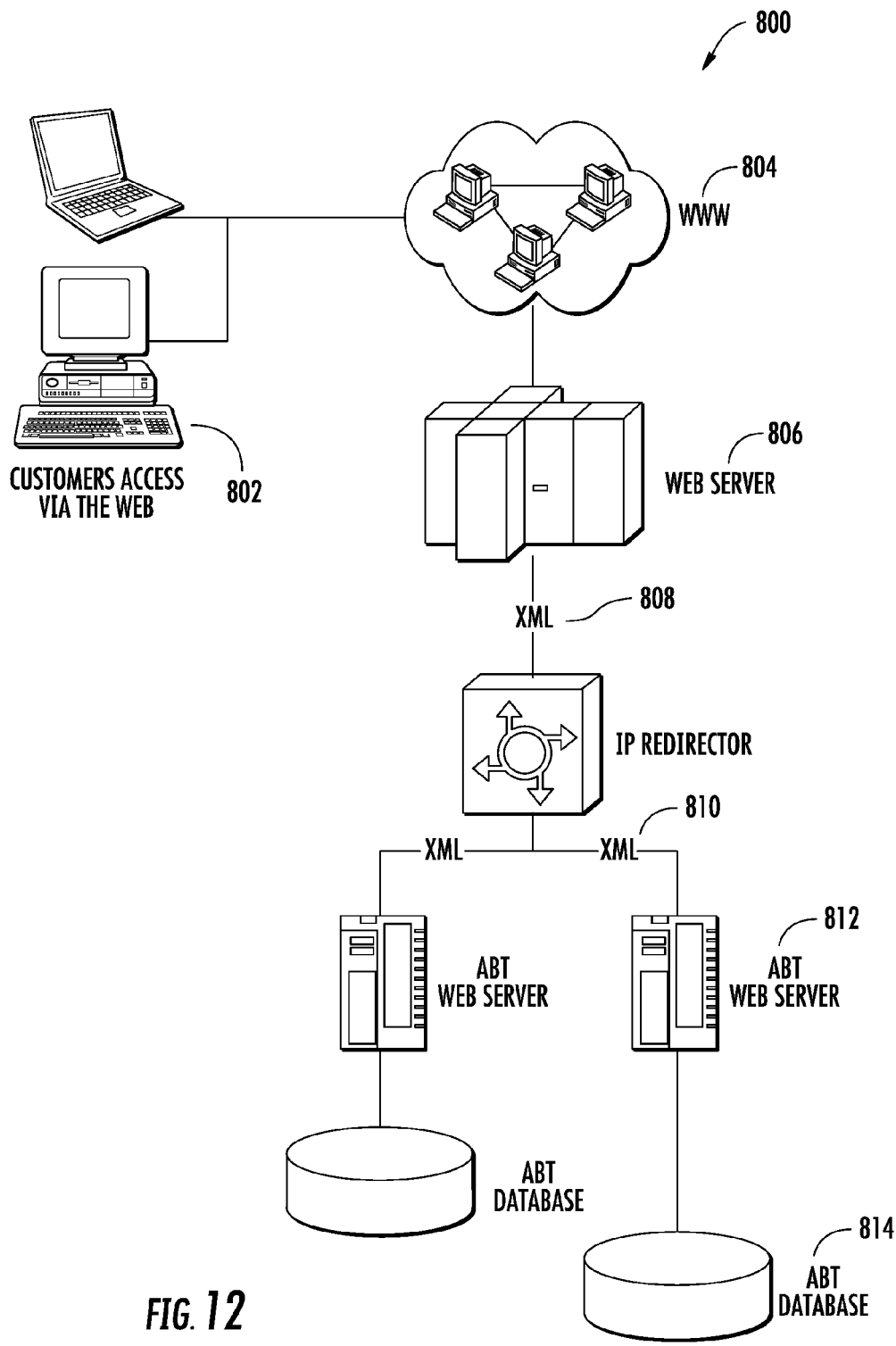

FIGS. 12-15 illustrate the following exemplary, non-limiting, implementations of the present invention:

A. External Web Customer Accesses Specified Secure Data or Performs a Specified Action Using a Web Site FIG. 12 shows an exemplary implementation 800 of a financial institution application environment, a customer can log on to a website 802 to apply for a loan and enter secure data or any specified data into a number of Web pages. When the customer's secure data is transferred for saving and entering into permanent storage, or transferred to another application (for example, a third party business partner), the secure data can be exposed to other users (for example, automated or human users accessing the secure data). Exemplary implementations of the present invention can record, analyze and report on any user (human or automated) that accesses the secure data via the Web 804 and the web server 806. For example, for a single customer transaction using the abnormal behavior tracking module, a Web applicant's background thread creates an XML document 808 that identifies the customer's secure data which has been sent to another application. The XML document 808 also identifies who and what was sent to the abnormal behavior tracking module as first data. Database fields identify the Web page that exposed the customer's secure data in the XML document 808. The XML document 808 can identify who or what automated process (for example a URL of the web page on which a user clicked the Submit button) accessed the secure data or performed a specified action. The Web application can specify a corresponding Web server name and IP address in the XML document 808. The Web application can specify the time the customer's secure data was accessed in a field of the XML document 808.

According to an exemplary implementation, having created the XML document 808, the Web application executed on web server 806 can transfer that document to one of the abnormal behavior servers 812 via the Internet Protocol (IP) redirector 810. The abnormal behavior tracking server 812 is exposed via an IP redirection as a single virtual service in one or more designated service centers. Subsequently the XML document 808 may be stored in the abnormal behavior database 814. According to implementations of the present invention, the analytic component can be decoupled from the real time abnormal behavior tracking data stream or can be adapted to have the analytic components plug into the real time abnormal behavior tracking data stream.

B. Internal User Accesses Specified Data or Performs Specified Action

Figure 13:
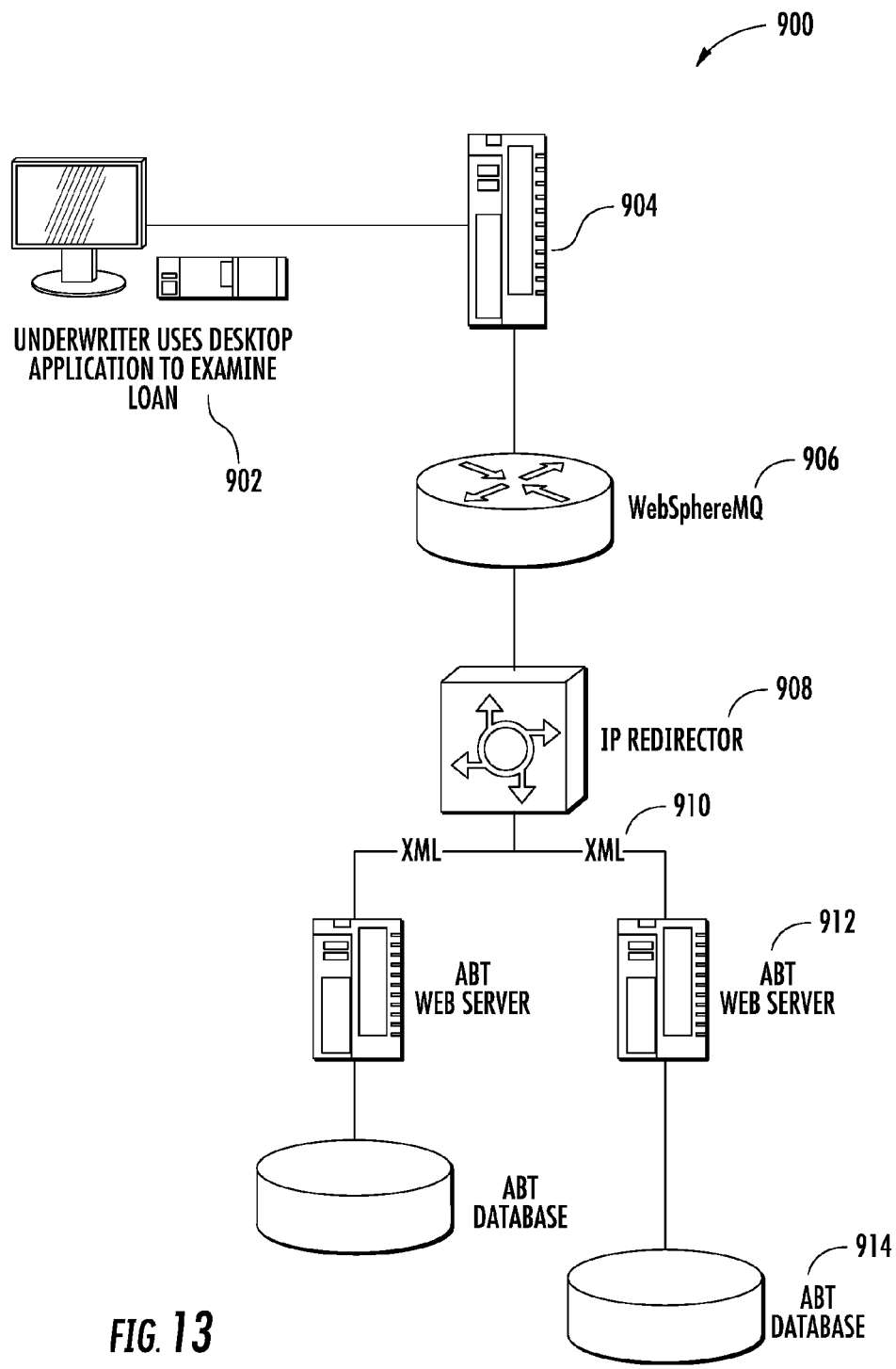

FIG. 13 shows an exemplary implementation 900 of the present invention 600 where a user on an internal distributed computing network to an organization can examine a loan application that includes secure data, by using any computer implemented software application 902. When that software application retrieves the secure data, it queues abnormal behavior tracking data for transmission. A processor (Web SphereMQ 906) creates an XML document 910 that identifies when secure data or specified data has been accessed. This ensures that the user using the application is not inconvenienced by the abnormal behavior tracking data handling. For example, an application used by underwriter using a desktop application 902 to examine a loan will send abnormal behavior tracking data via server 904 and WebSphereMQ 906 to the abnormal behavior tracking server 912. Using the WebSphereMQ transport mechanism, the application's background thread creates a WebSphereMQ message that identifies the customer's secure data that was presented to the underwriter along with the time it was accessed. The WebSphereMQ message can identify who and/or what accessed the abnormal behavior tracking information and when they accessed it. Upon creating the WebSphereMQ message, the underwriting application puts the document into the abnormal behavior tracking queue and WebSphereMQ ensures that the document is reliable transmitted to the abnormal behavior tracking server 912. The access information (such as in the XML document 910) is transmitted via the abnormal behavior tracking web server 905 and stored in the abnormal behavior tracking database 914.

C. Specified Data is Transmitted to an External Entity

Figure 14:
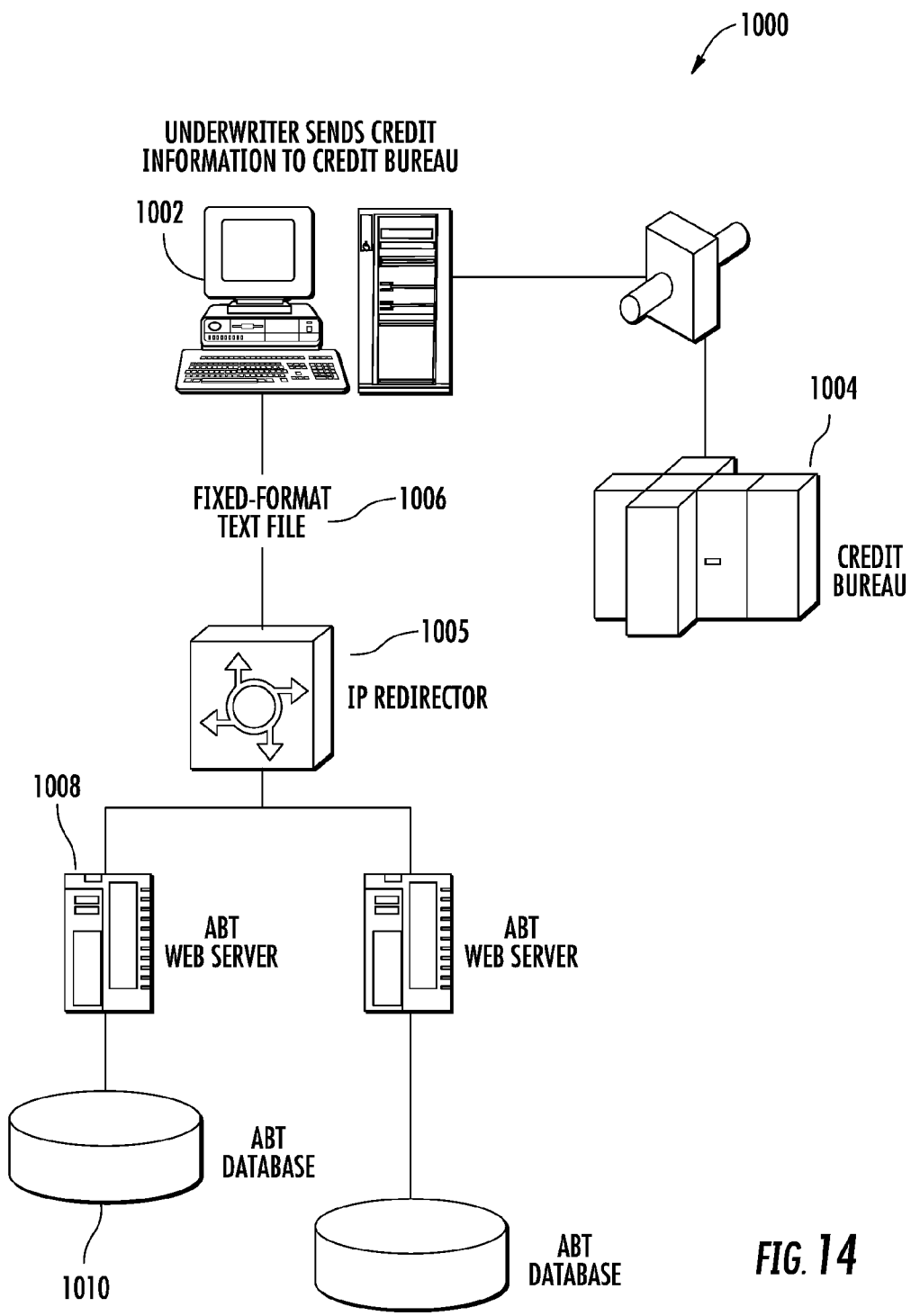

FIG. 14 shows an exemplary implementation 1000 of the present invention that records, analyzes and reports on access information for a user on the distributed computing network 1002 that is transmitted to external entities 1004. For example, during underwriting of loan applications, underwriting application software can send and receive customer secure data to and from a credit bureau 1004 for verification and credit score financial credit worthiness. Implementations of the present invention record, analyze, and report on the secure data. For example, when the underwriting application sends customer's secure data to the credit bureau, it queues anomalous behavior tracking data for asynchronous transmission. This ensures that anomalous behavior tracking data handling does not exceed tie constraints governing interaction with the credit bureau. If the underwriter is using an application that executes on the underwriter's computing device, the underwriting application will send anomalous behavior tracking data via a fixed format text file 1006 which will be written to a shared directory on the anomalous behavior tracking server 1008.

Using abnormal behavior tracking fixed format text data definition, the underwriter application's background thread creates a fixed format text document 1006 that identifies the customer's secure data that was sent to the credit bureau. The fixed format text document also identifies who and what accessed the abnormal behavior tracking information. The underwriting application specifies the assigned number representing its own name as the ApplicationNumber field, and a number identifying which component of the application accessed the customer secure data information is recorded as the ApplicationSubsectionNumber field. The user field includes the credit bureau's name. The underwriting application specifies the underwriter's desktop computer name and IP address in the MachineName and IPAddress fields. The underwriting application specifies the time that the customer's secure data was sent to the credit bureau in the DateTimeAccessed field and specifies the underwriter's time zone in the UTCTimeOffset field.

Having created the fixed format text document 1006, the underwriting application transfers the document via a reliable delivery service of the application developer's choosing to a destination file directory on a designated abnormal behavior tracking server 1008 via IP redirector 1005. An abnormal behavior tracking server 1008 instance will take the fixed format text files 1006 received in that destination file directory and persist that data into the abnormal behavior tracking database 1010.

D. Specified Data is Received From an External Entity

Figure 15:
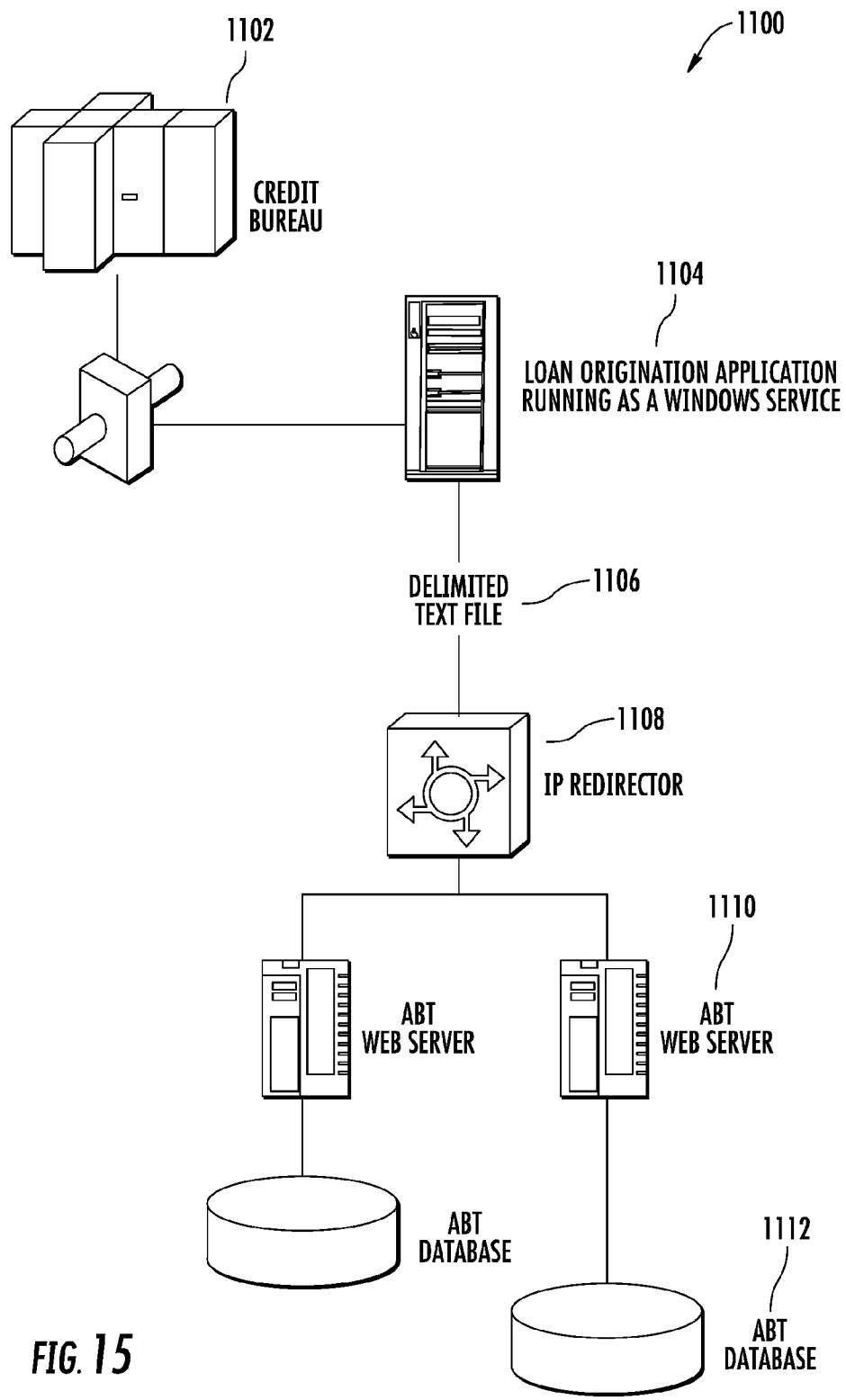

FIG. 15 shows an exemplary implementation 1100 of the present invention that records, analyzes and reports on access information for a user on the distributed computing network that is transmitted from external entities 1102. For example, a loan origination application running as a Windows service 1004 receives a financial credit worthiness from a credit bureau. The anomalous behavior tracking protocol requires that this information reception be recorded. When the origination application receives the customer's credit score financial credit worthiness, it queues anomalous behavior tracking data for asynchronous transmission. This ensures that any real time response constraints on the Windows service are not exceeded by anomalous behavior tracking data handling. For the purposes of this example, the loan origination application will batch anomalous behavior tracking data for transmission via a delimited text file 1106.

Using the anomalous behavior tracking delimited text data definition, the loan origination application's background thread adds a line to the delimited text document that identifies the customer's secure data and financial credit worthiness which the loan origination application received from the credit bureau. The delimited text document also must identify who and what accessed the anomalous behavior tracking information. The loan origination application specifies the assigned number representing its own name as the ApplicationNumber field, and a number identifying which application component accessed the customer secure data information is recorded as the ApplicationSubsectionNumber field. The User field includes the credit bureau's name. The loan origination application running as a Windows service records its server name and IP address in the MachineName and IPAddress fields. The loan origination application specifies the time that it received the customer's secure data and financial credit worthiness from the credit bureau in the DateTimeAccessed field. The loan origination application records the Windows service server's time zone in the UTCTimeOffset field. The Windows service can choose to send batch data either at regular intervals (by time or by number of lines). Having created the delimited text data document 1106, the Windows service transfers the document via a reliable delivery service of the application developer's choosing (for example, File Transfer Protocol (FTP) or Secure File Transfer Protocol (SFTP) to a destination (incoming) shared file directory on a designated anomalous behavior tracking server 1100 via IP redirector 1108. An anomalous behavior tracking service instance will take the delimited text files received in that destination file directory and persist the data into the anomalous behavior tracking database 1112 via an anomalous behavior tracking web server 1110.

According to exemplary implementations of the present invention, there are two different forms of batching abnormal behavior tracking data. The first form of batching abnormal behavior tracking data collects multiple separate accesses to the same customer's secure data information. For example, an application may access the customer's name and address fields once, but phone and credit card information several times each. This is termed single customer, multiple data field access. The second form of batching abnormal behavior tracking data collects access to multiple customers' data. For example, an application which creates monthly mortgage statements will access secure data information for many, many customers. This is termed multiple customer access. The two forms can occur individually and in combination. For instance, an application that repackages loans for resale could deal with several customers' loans in a single package, perhaps accessing each customer's address and phone numbers several times. In this case, the software application would need to log both multiple customer access and single customer, multiple data field access.

According to exemplary implementations of the present invention, if an application allows any secure data or specified information to be transmitted or exposed to a user, business partner, or other application, then that application must create a record (log entry) in abnormal behavior tracking for each access of each customer's data. The log entry must indicate which customer data was accessed. Metadata of when and how often any application accesses the following secure data elements, and which secure data elements were accessed are maintained in the abnormal behavior tracking records, including actual data. Client applications will be insulated from evolving data formats by using the client application programming interface (API).

Any individual access to the secure data or specified data for a specific customer will include some or all of these data items. For instance, a loan underwriting application will probably access all secure data or specified data. That application will log all the abnormal behavior tracking data items.

The above-described exemplary embodiments of an apparatus, system and method in computer-readable media include program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and so on, including a carrier wave transmitting signals specifying the program instructions, data structures, and so on. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Thus, methods, apparatus and computer program products have been described that provide for computer network security and, more specifically, monitoring application-based access to secure data and monitoring predetermined actions conducted on the applications to determine abnormal access or abnormal actions. Specific embodiments of the invention provide for an improved database for storing the monitored data. The database implements time period-structured tables and file directories, which increases the data storage and provides for automated data purging, backing-up of data and data recovery. Additional embodiments provide for tracking data attributes related to the monitored data, such as the quality of the monitored data, the quality of the monitored data and the origin of the monitored data. In addition, embodiments provide for validating the source of the monitored data to assure that data is received from a valid application.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for determining anomalous user behavior associated with application use in a computing network, the method comprising:
  validating, via a computing device processor, authentication credentials from an application requesting to deliver first data related to accessing sensitive information via predetermined applications and second data related to performing predetermined actions via predetermined applications, wherein validating the authentication credentials comprises determining the application is a validated source based at least partially on the authentication credentials, and wherein the authentication credentials are registered with a system prior to validating;
  receiving, at a computing device, the first and second data from the application via the computing network, wherein the first data comprises a job responsibility of a user and second data comprises one or more actions performed by the user, and collecting the first and second data based on determining that the application is a validated source;
  storing, in computing device memory, the first and second data in a database, wherein the database is configured to store the first and second data in a specified table based on a predetermined period of time associated with the receipt of the data;
  comparing, via a computing device processor, the first data to anomalous access criteria and the second data to anomalous action criteria, wherein the anomalous access criteria comprises a job responsibility of the user, wherein the anomalous action criteria comprises one or more actions performed by the user considered to be normal based on at least the job responsibility of the user; and
  determining, via a computing device processor, a normal behavior or anomalous behavior based on at least the comparison of the first data to anomalous access criteria and the second data to anomalous action criteria.

2. The method of claim 1, wherein storing further comprises storing the first and second data in the database, wherein the database is configured to store the first and second data in the specified table based on the predetermined period of time associated with the receipt of the data, and wherein the predetermined period of time is a calendar month.

3. The method of claim 1, further comprising generating, via a computing device processor, a new table in the database based on occurrence of a new predetermined time period.

4. The method of claim 1, further comprising automatically purging, via a computing device processor, a specified table from the database based on a time period associated with the specified table and a predetermined time required for storage.

5. The method of claim 1, wherein storing further comprises storing, in the computing device memory, the first and second data in a file system, wherein the file system is configured to store the first and second data in a specified file directory based on a date associated with the receipt of the data.

6. The method of claim 5, further comprising automatically purging, via a computing device processor, a specified file directory from the file system based on a date associated with the specified file directory and a predetermined time required for storage.

7. The method of claim 1, further comprising communicating, via a computing device processor, the stored first and second data to a back-up database, wherein the back-up database is configured to store the first and second data for a predetermined period of time.

8. The method of claim 1, wherein validating further comprises:
  comparing one or more determined features to the authentication credentials, wherein the one or more determined features comprise an origin in the computing network associated with the first and second data and/or a delivery means in the computing network associated with the first and second data; and
  determining that the application is a valid source or not a valid source based on at least the comparison of one or more determined features to the authentication credentials.

9. A method for monitoring data attributes in a system for determining anomalous user behavior associated with application use in a computing network, the method comprising:
  validating, via a computing device processor, authentication credentials from an application requesting to deliver first data related to accessing sensitive information via predetermined applications and second data related to performing predetermined actions via predetermined applications, wherein validating the authentication credentials comprises determining the application is a validated source based at least partially on the authentication credentials, and wherein the authentication credentials are registered with the system prior to validating;
  receiving, at a computing device, the first and second data from the application via the computing network, wherein the first data comprises a job responsibility of a user and second data comprises one or more actions performed by the user, and collecting the first and second data based on determining that the application is a validated source;
  automatically tracking, via a computing device processor, first data attributes related to the first data and second data attributes related to the second data, wherein the first and second data attributes are associated with at least one of (a) an origin of the data; (b) a quantity of data received; (c) a quality of data received; (d) a data delivery communication mechanism; or (e) the destination of the data; and
  automatically generating, via a computing device processor, one or more reports that indicate performance of the system based on the first data attributes and second data attributes, wherein the received first data is compared to anomalous access criteria and the second data is compared to anomalous action criteria, wherein the anomalous access criteria comprises a job responsibility of the user, wherein the anomalous action criteria comprises one or more actions performed by the user considered to be normal based on at least the job responsibility of the user; and
  determining, via a computing device processor, a normal behavior or anomalous behavior based on at least the comparison of the first data to the anomalous access criteria and the second data to the anomalous action criteria.

10. The method of claim 9, wherein tracking further comprises tracking, via the computing device processor, the first and second data attributes, wherein the first and second data attributes are associated with the quantity of data received including one or more of (a) an overall volume of first and second data being received, (b) a volume of first and second data being received from a specified application, or (c) a volume of first and second data being received that is associated with one or more specific users.

11. The method of claim 9, wherein tracking further comprises tracking, via the computing device processor, the first and second data attributes, wherein the first and second data attributes are associated with the quality of data being received including one or more of (a) a volume of first and second data being stored, (b) a volume of first and second data being rejected (c) a reason for rejecting first or second data.

12. The method of claim 9, wherein tracking further comprises tracking, via the computing device processor, the first and second data attributes, wherein the first and second data attributes are associated with the origin of the data being received including one or more of (a) an application associated with the data, (b) a location where the application was executed, or (c) a delivery path for receiving the first and second data.

13. A method for assuring data source in a system for determining anomalous user behavior associated with application use in a computing network, the method comprising:
  validating, via a computing device processor, authentication credentials from an application requesting to deliver first data related to accessing sensitive information from the application or second data related to performing predetermined actions on applications, wherein validating the authentication credentials comprises determining the application is a validated source based at least partially on the authentication credentials, and wherein the authentication credentials are registered with the system prior to validating; and
  receiving, at a computing device, via one of web service communication, message queuing communication, or file transfer communication, the first data or second data from the application via the computing network and collecting the first and second data based on the validation, wherein the first data comprises a job responsibility of a user and second data comprises one or more actions performed by the user,
  wherein the received first data is compared to anomalous access criteria and the second data is compared to anomalous action criteria, wherein the anomalous access criteria comprises a job responsibility of the user, wherein the anomalous action criteria comprises one or more actions performed by the user considered to be normal based on at least the job responsibility of the user; and
  determining, via a computing device processor, a normal behavior or anomalous behavior based on at least the comparison of the first data to the anomalous access criteria and the second data to the anomalous action criteria.

14. The method of claim 13, wherein validation further comprises validating, via the computing device processor, authentication credentials generated by the application and wherein receiving further comprises, receiving, at the computing device, via web service communication, the first data or second data based on the validation.

15. The method of claim 13, wherein validating further comprises registering the application's validation credentials with the system prior to validating and wherein receiving further comprises, receiving, at the computing device, via message queuing communication, the first data or second data based on the validation.

16. An apparatus for determining anomalous user behavior associated with application use in a computing network, the apparatus comprising:
 a computing platform including at least one processor and a memory in communication with the processor; and
 an anomalous behavior tracking module stored in the memory, executable by the processor and configured to determine anomalous behavior associated with applications used in a computing network, the module including,
  a services sub-module configured to receive first data related to accessing sensitive information via predetermined applications and second data related to performing predetermined actions from predetermined applications via the computing network, wherein the first data comprises a job responsibility of a user and second data comprises one or more actions performed by the user, wherein the services sub-module includes a validation module configured to validate authentication credentials from an application requesting to deliver the first and second data, wherein validating the authentication credentials comprises determining the application is a validated source based at least partially on the authentication credentials, and wherein the authentication credentials are registered with a system prior to validating, the services sub-module collecting the first and second data based on determining that the application is a validated source;
  a database configured to store the first and second data in a specified table based on a predetermined period of time associated with the receipt of the data, and
  an analytics sub-module configured to determine a normal behavior or an anomalous behavior based on comparing the first data to anomalous access criteria and comparing the second data to anomalous action criteria, wherein the anomalous access criteria comprises a job responsibility of the user, wherein the anomalous action criteria comprises one or more actions performed by the user considered to be normal based on at least the job responsibility of the user.

17. The apparatus of claim 16, wherein the database is further configured to store the first and second data in the specified table based on the predetermined period of time associated with the receipt of the data, and wherein the predetermined period of time is a calendar month.

18. The apparatus of claim 16, wherein the anomalous behavior tracking module further comprises a table generation routine configured to generate a new table in the database based on occurrence of a new predetermined time period.

19. The apparatus of claim 16, wherein the anomalous behavior tracking module further comprises a data purge routine configured to automatically purge a specified table from the database based on a time period associated with the specified table and a predetermined time required for storage.

20. The apparatus of claim 16, wherein the database further comprises a file system configured to store the first and second data in a specified file directory based on a date associated with the receipt of the data.

21. The apparatus of claim 20, wherein the anomalous behavior tracking module further comprises a data purge routine configured to automatically purge a specified file directory from the file system based on a date associated with the specified file directory and a predetermined time required for storage.

22. The apparatus of claim 16, further wherein the anomalous behavior tracking module further comprises a data back-up routine configured to communicate the stored first and second data to a back-up database, wherein the back-up database is configured to store the first and second data for a predetermined period of time.

23. The apparatus of claim 16, wherein validating further comprises:
 compare one or more determined features to the authentication credentials, wherein the one or more determined features comprise an origin in the computing network associated with the first and second data and/or a delivery means in the computing network associated with the first and second data; and
 determine that the application is a valid source or not a valid source based on at least the comparison of one or more determined features to the authentication credentials.

24. An apparatus for monitoring data attributes in a system for determining anomalous user behavior associated with application use in a computing network, the apparatus comprising:
 a computing platform including at least one processor and a memory in communication with the processor; and
 an anomalous behavior tracking module stored in the memory, executable by the processor and configured to determine anomalous behavior associated with applications used in a computing network, the module including,
  a services sub-module configured to receive first data related to accessing sensitive information via predetermined applications and second data related to performing predetermined actions from predetermined applications via the computing network, wherein the first data comprises a job responsibility of a user and second data comprises one or more actions performed by the user, wherein the services sub-module includes a validation module configured to validate authentication credentials from an application requesting to deliver the first and second data, wherein validating the authentication credentials comprises determining the application is a validated source based at least partially on the authentication credentials, and wherein the authentication credentials are registered with the system prior to validating, the services sub-module collecting the first and second data based on determining that the application is a validated source,
  a data attribute tracking routine configured to automatically track first data attributes related to the first data and second data attributes related to the second data, wherein the first and second data attributes are associated with at least one of (a) an origin of the data; (b) a quantity of data received (c) a quality of data received; (d) a data delivery communication mechanism; or (e) the destination of the data, and
  a report generation routine configured to generate one or more reports that indicate performance of the system based on the first data attributes and second data attributes, and
  an analytics sub-module configured to determine a normal behavior or an anomalous behavior based on comparing the first data to anomalous access criteria and comparing the second data to anomalous action criteria, wherein the anomalous access criteria comprises a job responsibility of the user, wherein the anomalous action criteria comprises one or more actions performed by the user considered to be normal based on at least the job responsibility of the user.

25. The apparatus of claim 24, wherein the data attribute tracking routine is further configured to track the first and second data attributes, wherein the first and second data attributes are associated with the quantity of data received and include one or more of (a) an overall volume of first and second data being received, (b) a volume of first and second data being received from a specified application, or (c) a volume of first and second data being received that is associated with one or more specific users.

26. The apparatus of claim 24, wherein the data attribute tracking routine is further configured to track the first and second data attributes, wherein the first and second data attributes are associated the quality of data being received and include one or more of (a) a volume of first and second data being stored, (b) a volume of first and second data being rejected (c) a reason for rejecting first or second data.

27. The apparatus of claim 24, wherein the data attribute tracking routine is further configured to track the first and second data attributes, wherein the first and second data attributes are associated the origin of the data being received including one or more of (a) an application associated with the data, (b) a location where the application was executed, or (c) a delivery path for receiving the first and second data.

28. An apparatus for assuring data source in a system for determining anomalous user behavior in a computing network, the apparatus comprising:
a computing platform including at least one processor and a memory in communication with the processor; and
an anomalous behavior tracking module stored in the memory, executable by the processor and configured to determine anomalous behavior associated with applications used in a computing network, the module including,
a services sub-module configured to receive first data related to accessing sensitive information via predetermined applications and second data related to performing predetermined actions from predetermined applications via the computing network, wherein the first data comprises a job responsibility of a user and second data comprises one or more actions performed by the user, wherein the services sub-module includes a validation module configured to validate authentication credentials from an application requesting to deliver the first or second data via one of web service communication, message queuing communication or file transfer communication, wherein validating the authentication credentials comprises determining the application is a validated source based at least partially on the authentication credentials, and wherein the authentication credentials are registered with the system prior to validating, the services sub-module collecting the first and second data based on determining that the application is a validated source, and
an analytics sub-module configured to determine a normal behavior or an anomalous behavior based on comparing the first data to anomalous access criteria and comparing the second data to anomalous action criteria, wherein the anomalous access criteria comprises a job responsibility of the user, wherein the anomalous action criteria comprises one or more actions performed by the user considered to be normal based on at least the job responsibility of the user.

29. The apparatus of claim 28, wherein the validation routine is further configured to validate the authentication credentials generated by the application requesting to deliver the first or second data via web service communication.

30. The apparatus of claim 28, wherein the validation routine is further configured to register the validation credentials associated with the application requesting to deliver the first or second data via message queuing communication.

31. A computer program product comprising:
a non-transitory computer-readable medium comprising:
a first set of code for causing a computer to validate authentication credentials from an application requesting to deliver first data related to accessing sensitive information via predetermined applications and second data related to performing predetermined actions via predetermined applications, wherein the first data comprises a job responsibility of a user and second data comprises one or more actions performed by the user, wherein validating the authentication credentials comprises determining the application is a validated source based at least partially on the authentication credentials, and wherein the authentication credentials are registered with a system prior to validating;
a second set of codes for causing a computer to receive the first and second from the application via a computing network and collect the first and second data based on determining that the application is a validated source;
a third set of codes for causing a computer to store the first and second data in a database, wherein the database is configured to store the first and second data in a specified table based on a predetermined period of time associated with the receipt of the data; and
a fourth set of codes for causing a computer to determine a normal behavior or an anomalous behavior based on a comparing the first data to anomalous access criteria and comparing the second data to anomalous action criteria, wherein the anomalous access criteria comprises a job responsibility of the user, wherein the anomalous action criteria comprises one or more actions performed by the user considered to be normal based on at least the job responsibility of the user.

32. The computer program product of claim 31, wherein the third set of codes is further configured to cause the computer to store the first and second data in the database, wherein the database is configured to store the first and second data in the specified table based on the predetermined period of time associated with the receipt of the data, and wherein the predetermined period of time is a calendar month.

33. The computer program product of claim 31, further comprising a fifth set of codes for causing a computer to generate a new table in the database based on occurrence of a new predetermined time period.

34. The computer program product of claim 31, further comprising a fifth set of codes for causing a computer to automatically purge a specified table from the database based on a time period associated with the specified table and a predetermined time required for storage.

35. The computer program product of claim 31, wherein the third set of codes is further configured to cause the computer to store the first and second data in a file system, wherein the file system is configured to store the first and second data in a specified file directory based on a date associated with the receipt of the data.

36. The computer program product of claim 35, further comprising a fifth set of codes for causing a computer to automatically purge a specified file directory from the file system based on a date associated with the specified file directory and a predetermined time required for storage.

37. The computer program product of claim 31, further comprising a fifth set of codes for causing a computer to communicate the stored first and second data to a back-up database, wherein the back-up database is configured to store the first and second data for a predetermined period of time.

38. The computer program product of claim 31, wherein the first set of codes is further configured to cause a computer to:
compare one or more determined features to the authentication credentials, wherein the one or more determined features comprise an origin in the computing network associated with the first and second data and/or a delivery means in the computing network associated with the first and second data; and
determine that the application is a valid source or not a valid source based on at least the comparison of one or more determined features to the authentication credentials.

39. A computer program product comprising:
a non-transitory computer-readable medium comprising:
a first set of code for causing a computer to validate authentication credentials from an application requesting to deliver first data related to accessing sensitive information via predetermined applications and second data related to performing predetermined actions via predetermined applications, wherein the first data comprises a job responsibility of a user and second data comprises one or more actions performed by the user, wherein validating the authentication credentials comprises determining the application is a validated source based at least partially on the authentication credentials, and wherein the authentication credentials are registered with a system prior to validating;
a second set of codes for causing a computer to receive the first and second data from the application via a computing network and collect the first and second data based on determining that the application is a validated source;
a third set of codes for causing a computer to automatically track first data attributes related to the first data and second data attributes related to the second data, wherein the first and second data attributes are associated with at least one of (a) an origin of the data; (b) a quantity of data received (c) a quality of data received; (d) a data delivery communication mechanism; or (e) the destination of the data;
a fourth set of codes for causing a computer to automatically generate one or more reports that indicate performance of the system based on the first data attributes and second data attributes; wherein the received first data is compared to anomalous access criteria and the second data is compared to anomalous action criteria, wherein the anomalous access criteria comprises a job responsibility of the user, wherein the anomalous action criteria comprises one or more actions performed by the user considered to be normal based on at least the job responsibility of the user; and
a fifth set of codes for causing a computer to determine a normal behavior or anomalous behavior based on at least the comparison of the first data to the anomalous access criteria and the second data to the anomalous action criteria.

40. The computer program product of claim 39, wherein the third set of codes is further configured to cause the computer to track the first and second data attributes, wherein the first and second data attributes are associated with the quantity of data received including one or more of (a) an overall volume of first and second data being received, (b) a volume of first and second data being received from a specified application, or (c) a volume of first and second data being received that is associated with one or more specific users.

41. The computer program product of claim 39, wherein the third set of codes is further configured to cause the computer to track the first and second data attributes, wherein the first and second data attributes are associated the quality of data being received including one or more of (a) a volume of first and second data being stored, (b) a volume of first and second data being rejected (c) a reason for rejecting first or second data.

42. The computer program product of claim 39, wherein the third set of codes is further configured to cause the computer to track the first and second data attributes, wherein the first and second data attributes are associated the origin of the data being received including one or more of (a) an application associated with the data, (b) a location where the application was executed, or (c) a delivery path for receiving the first and second data.

43. A computer program product comprising:
a non-transitory computer-readable medium comprising:
a first set of codes for causing a computer to validate authentication credentials from an application requesting to deliver first data related to accessing sensitive information from the application or second data related to performing predetermined actions on applications, wherein the first data comprises a job responsibility of a user and second data comprises one or more actions performed by the user, wherein validating the authentication credentials comprises determining the application is a validated source based at least partially on the authentication credentials, and wherein the authentication credentials are registered with a system prior to validating;
a second set of codes for causing a computer to receive, via one of web service communication, message queuing communication or file transfer, the first data or second data from the application via a computing network and collect the first and second data based on the validation; and
a third set of codes for causing a computer to determine a normal behavior or an anomalous behavior based on a comparing the first data to anomalous access criteria and comparing the second data to anomalous action criteria, wherein the anomalous access criteria comprises a job responsibility of the user, wherein the anomalous action criteria comprises one or more actions performed by the user considered to be normal based on at least the job responsibility of the user.

44. The computer program product of claim 43, wherein the first set of codes is further configured to cause the computer to validate the authentication credentials generated by the application and wherein the second set of codes is further configured to cause the computer to receive, via web service communication, the first data or second data based on the validation.

45. The computer program product of claim 43, the first set of codes is further configured to cause the computer to register the application's validation credentials with the system prior to validating and the second set of codes is further configured to cause the computer to receive, via message queuing communication, the first data or second data based on the validation.

* * * * *